Figures 1, 2:
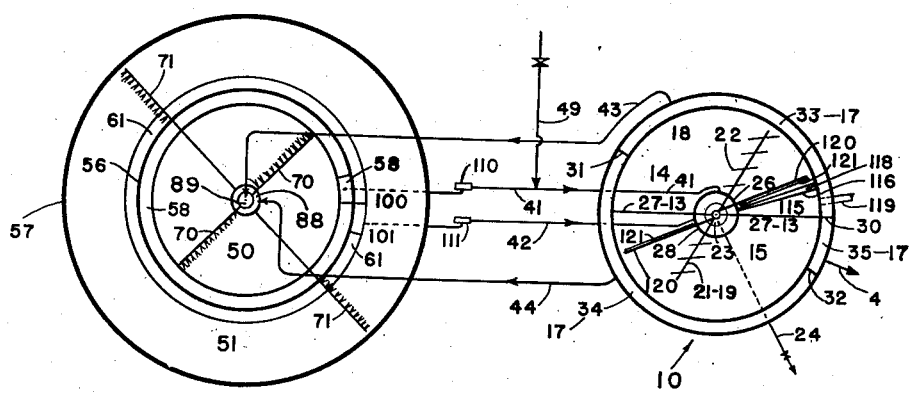

Aug. 15, 1944.   H. A. TREBLER   2,355,760
LIQUID CLARIFICATION APPARATUS
Filed Nov. 14, 1942   10 Sheets-Sheet 1

INVENTOR
HENNING A. TREBLER
BY
ATTORNEY

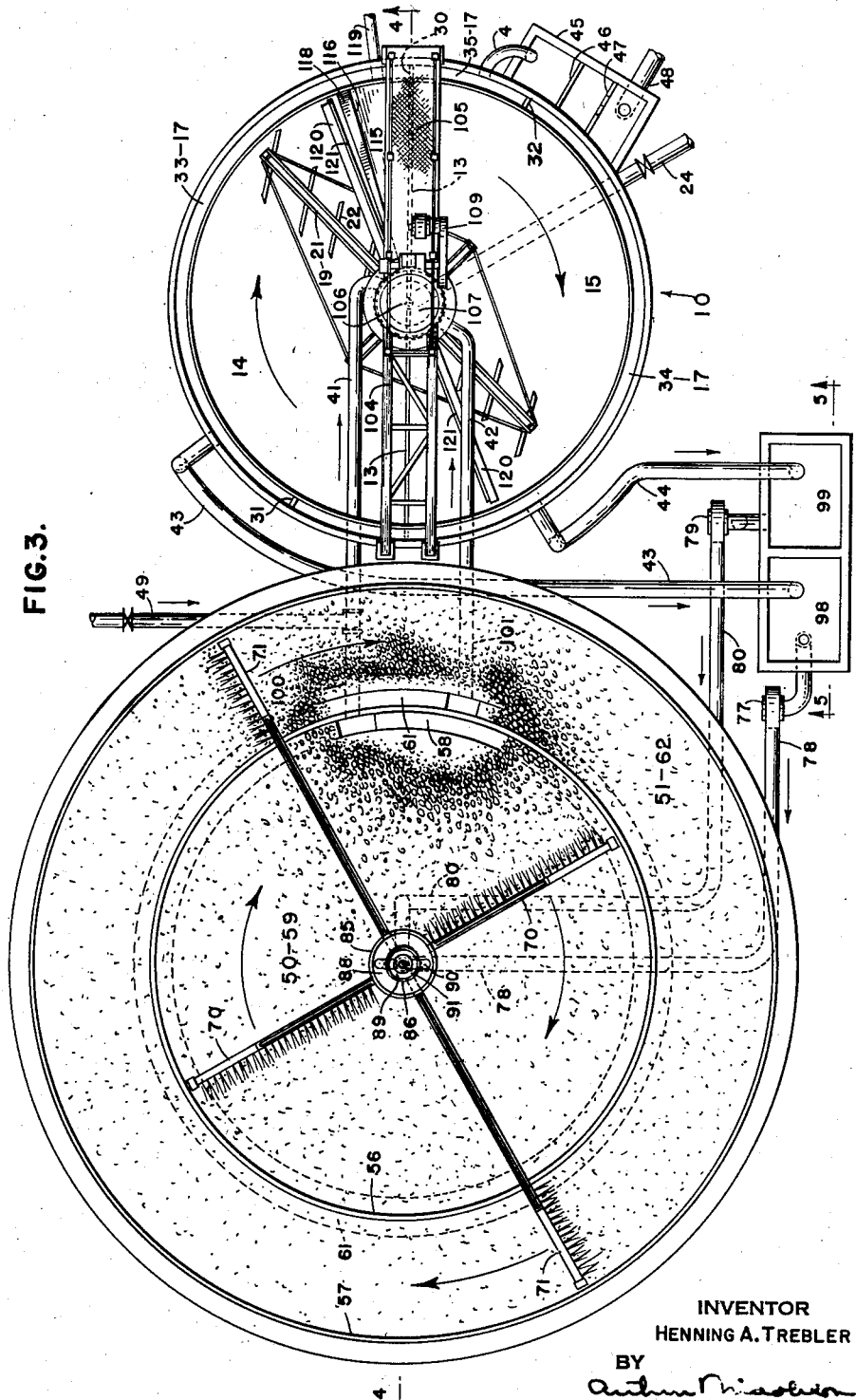

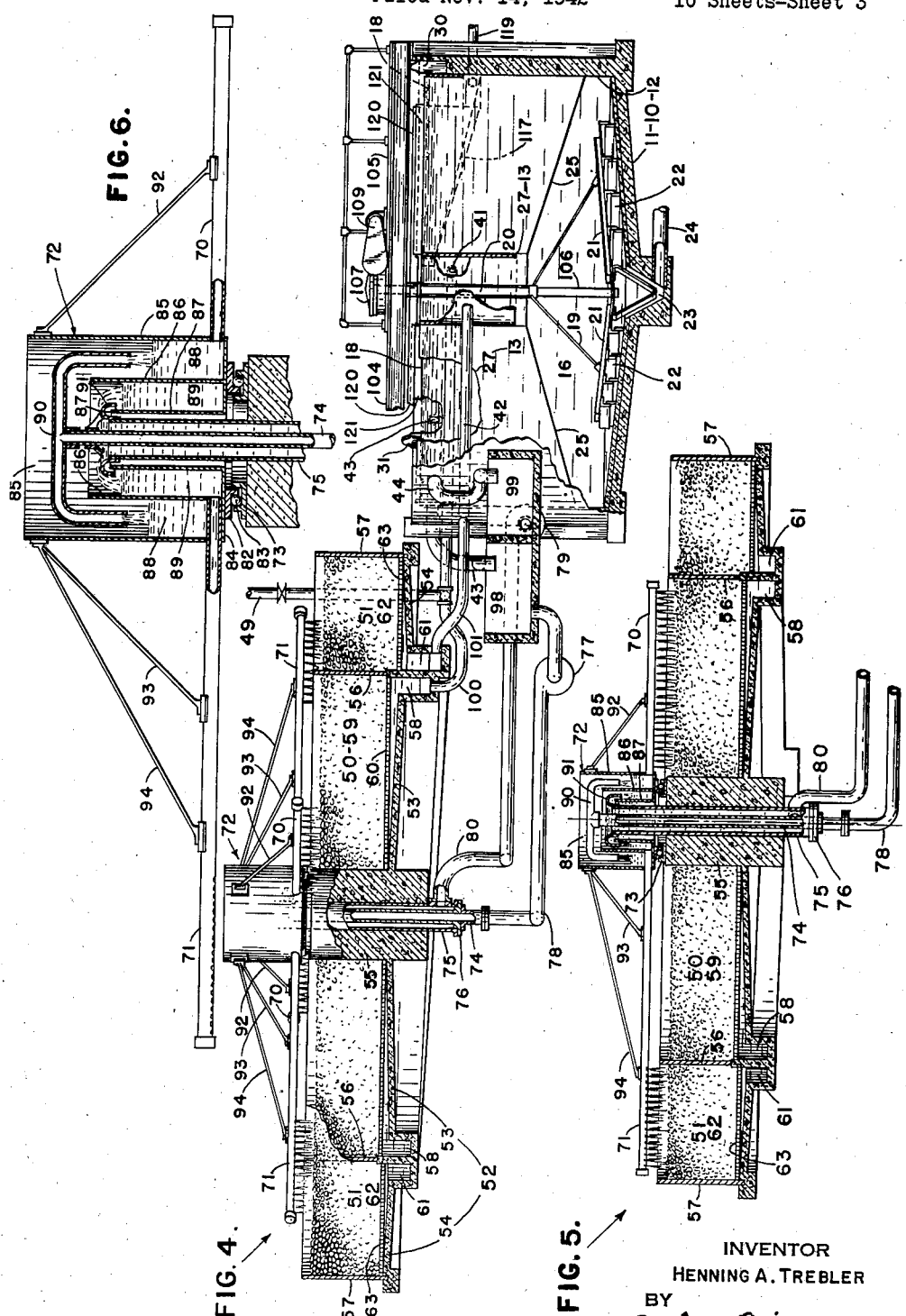

Aug. 15, 1944.  H. A. TREBLER  2,355,760
LIQUID CLARIFICATION APPARATUS
Filed Nov. 14, 1942   10 Sheets-Sheet 4

INVENTOR
HENNING A. TREBLER
BY
ATTORNEY

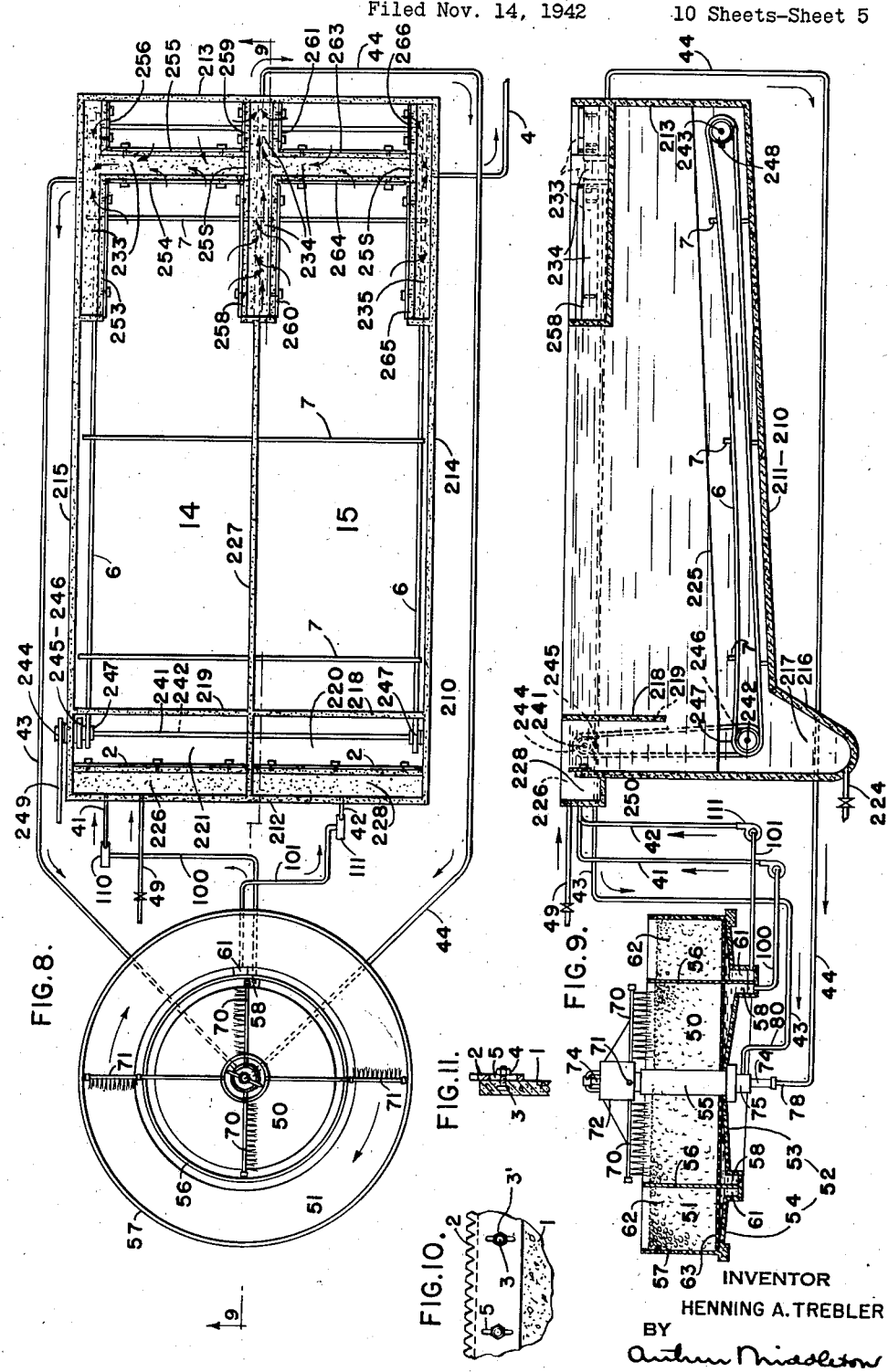

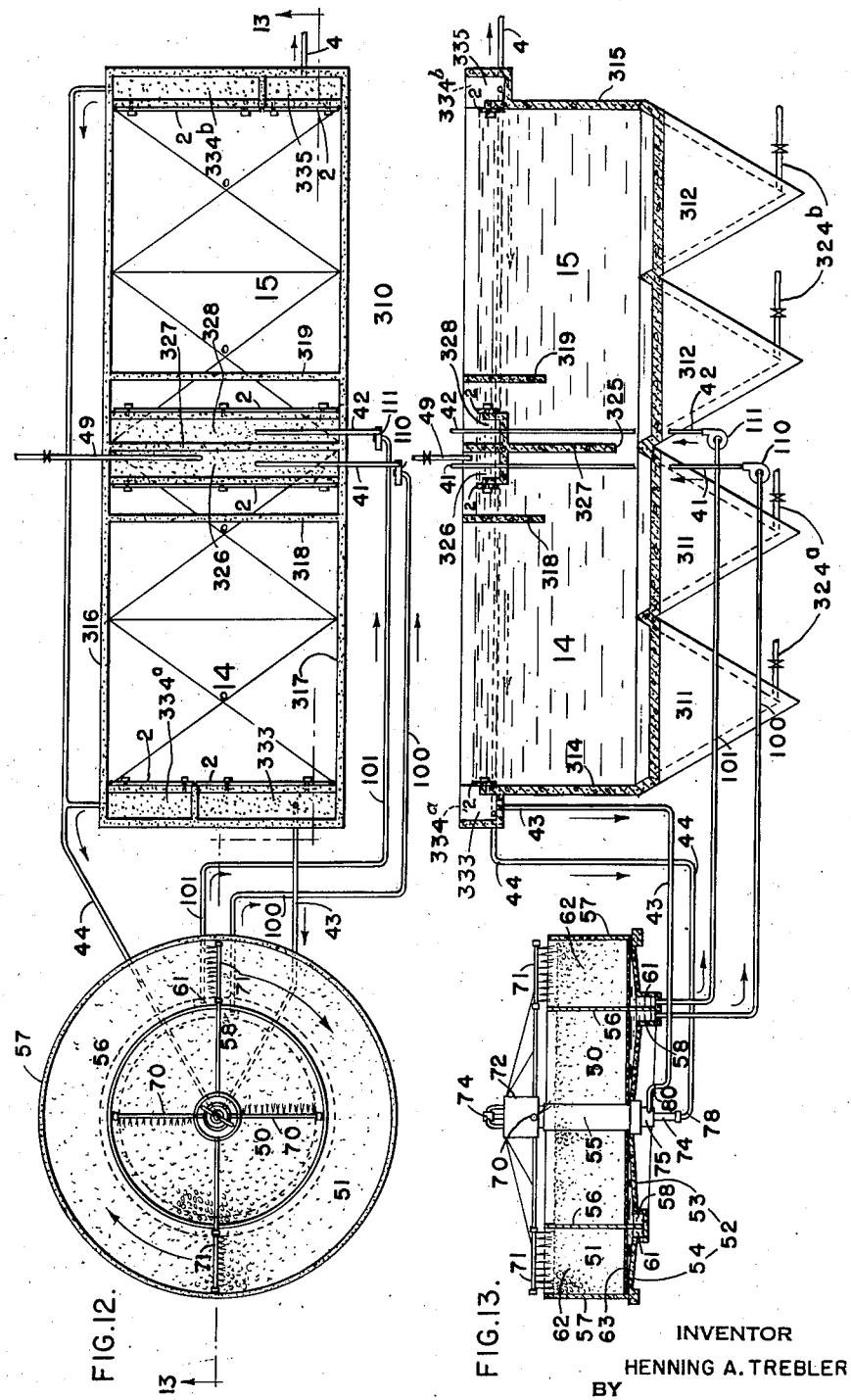

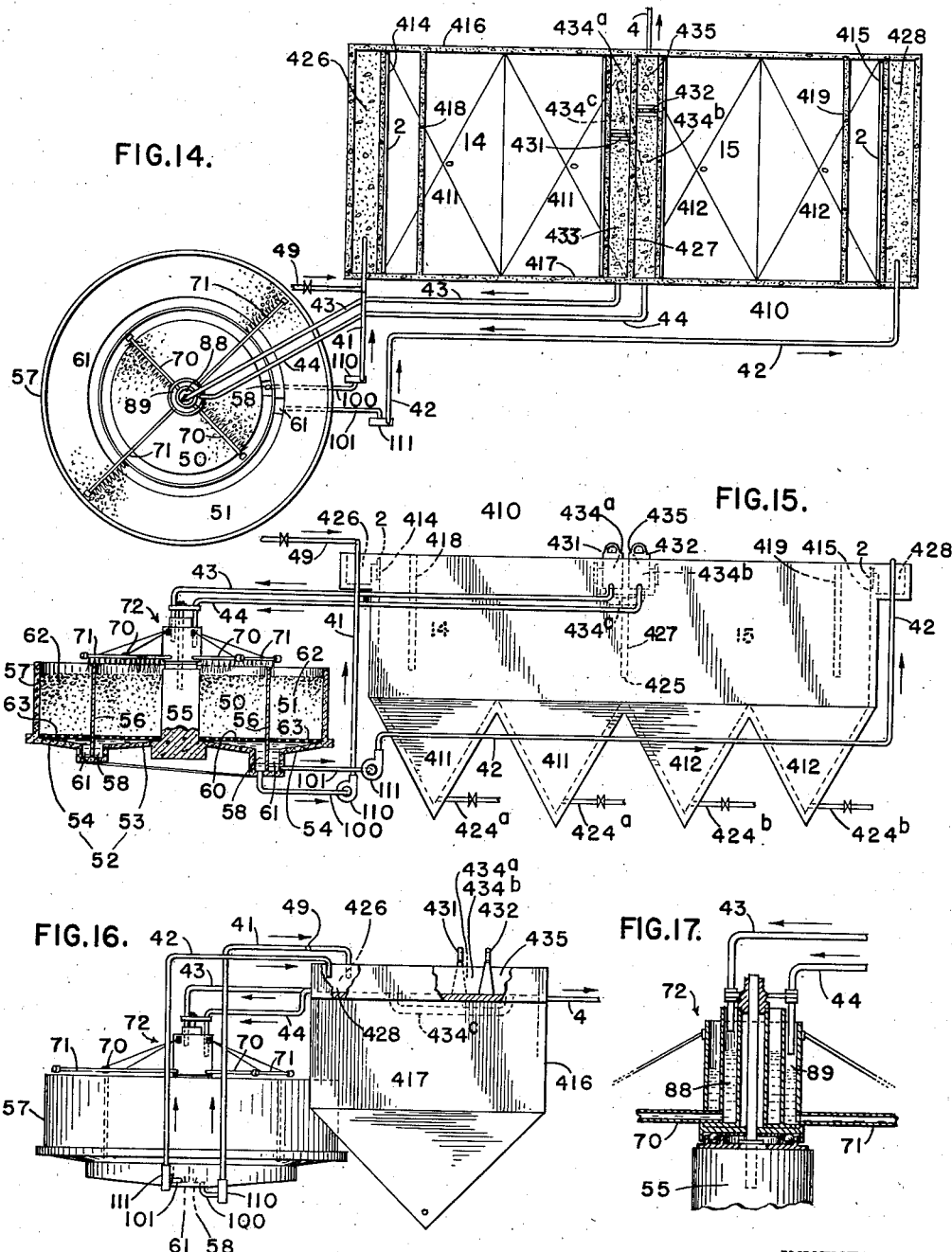

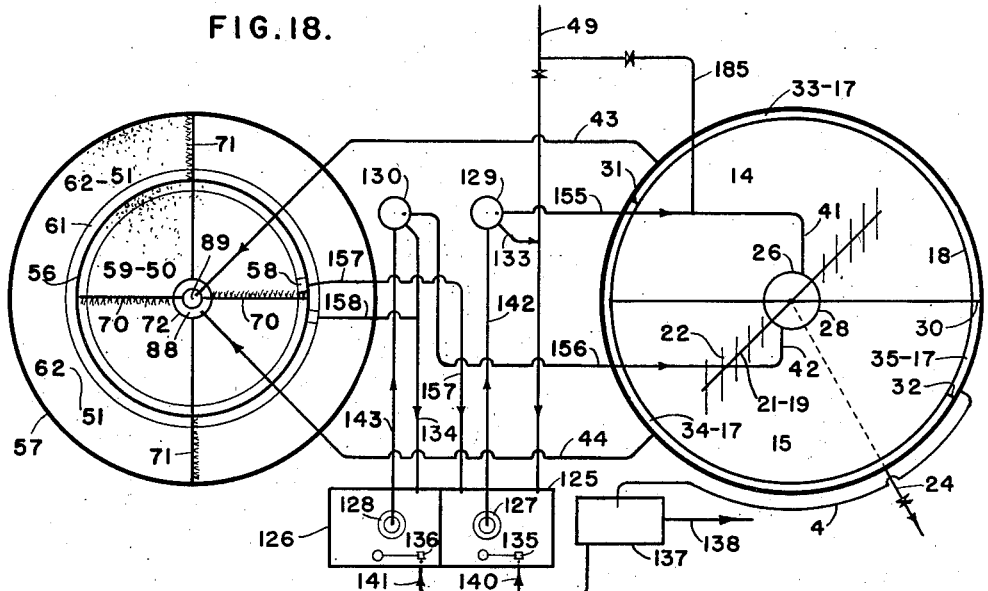
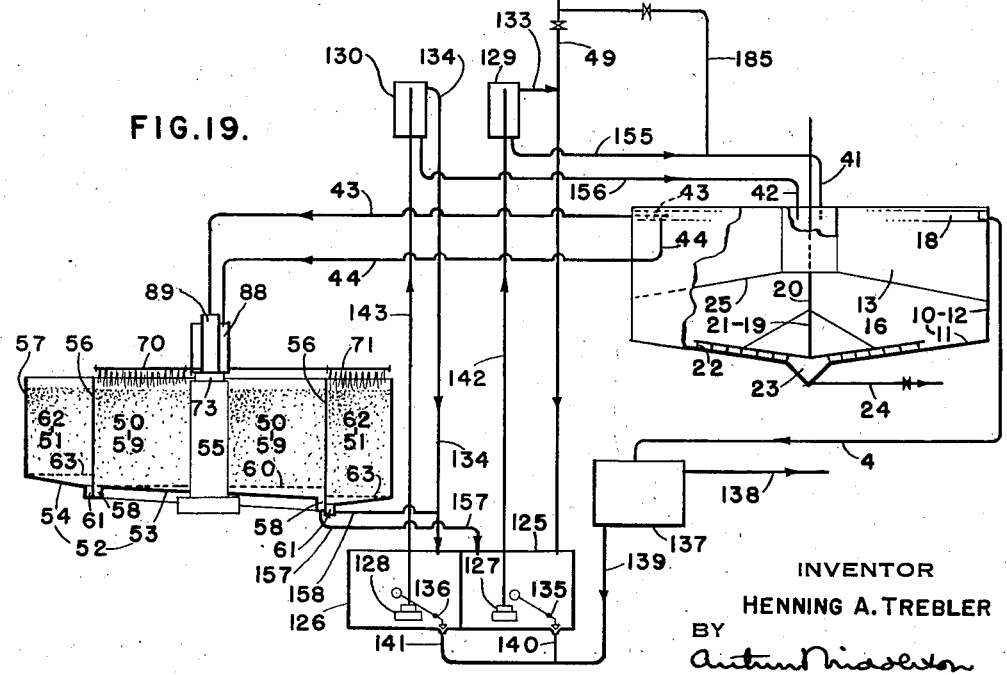

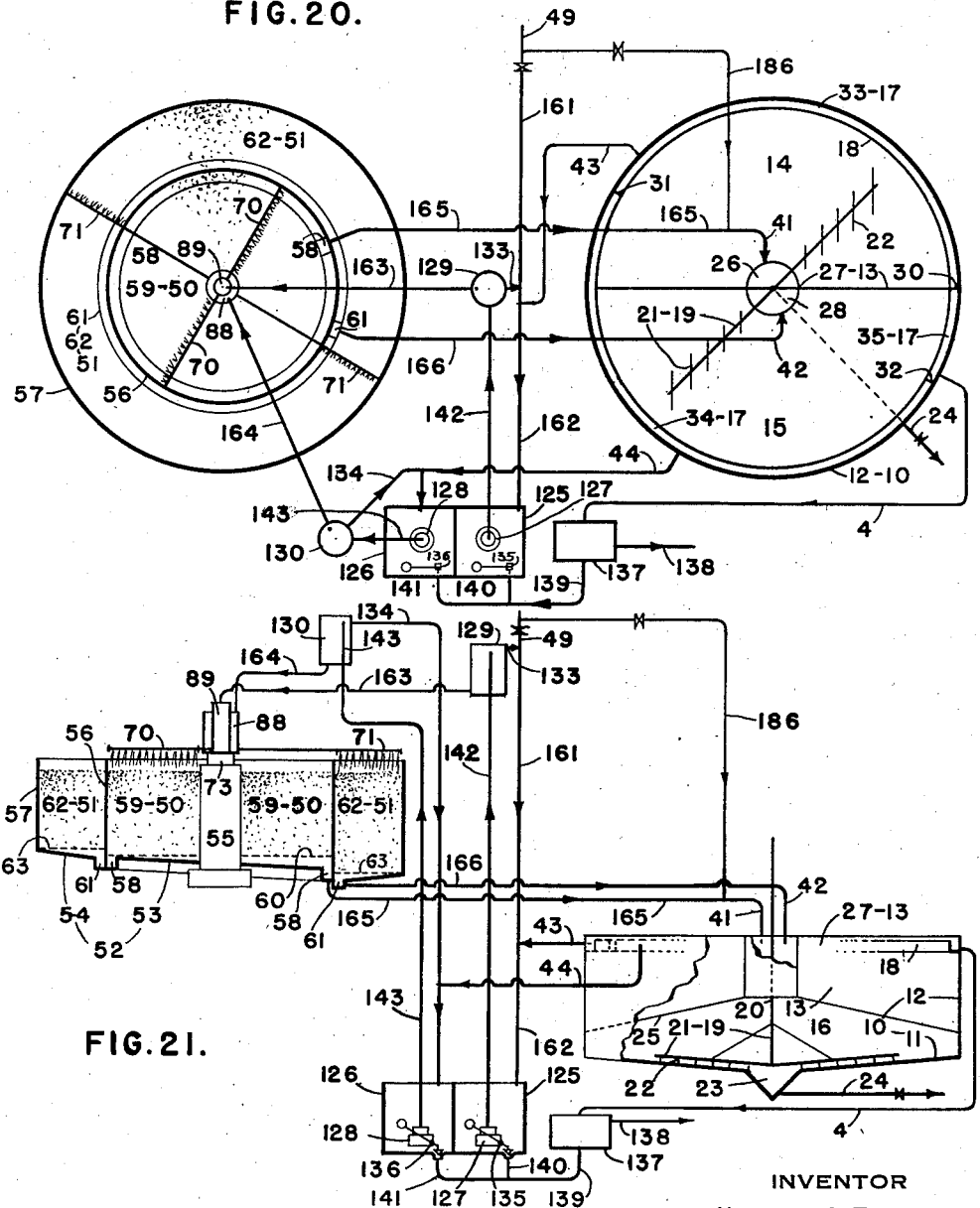

Aug. 15, 1944.   H. A. TREBLER   2,355,760
LIQUID CLARIFICATION APPARATUS
Filed Nov. 14, 1942   10 Sheets-Sheet 10

INVENTOR
HENNING A. TREBLER
BY
ATTORNEY

Patented Aug. 15, 1944

2,355,760

UNITED STATES PATENT OFFICE 2,355,760

LIQUID CLARIFICATION APPARATUS

Henning Astrup Trebler, Baltimore, Md., assignor to Sealtest, Inc., New York, N. Y., a corporation of Maryland Application November 14, 1942, Serial No. 465,532

21 Claims. (Cl. 210—7)

The invention relates to a novel combination of a specially constructed clarifier and trickling filters for use in the practice of a plural stage biologic treatment of sewage or other impure liquids containing putrescible organic matter. It concerns a system which has been devised for treating milk waste. However, as already indicated, the apparatus or system which is the basis of the present invention is broadly applicable to the treatment of impure liquids containing decomposable putrescible solids or matter.

In the conventional plans for the treatment of such impure liquids where two biologic treating stages are carried out there are employed two separate clarifiers and two separate biologic treating units typified by two horizontally spaced separate trickling filters. The resulting plan or system has been one requiring a relatively large ground area and also having a relatively complicated piping hook-up or arrangement and an object of this invention is to produce a system or arrangement which is relatively simple as compared with the present-day systems and so that a lower total cost for the individual structural elements entering into the system is realized with an attendant simplification of piping and also a consequent reduced amount of mechanical equipment.

In order to attain the sought for end this invention contemplates the employment in concentric arrangement of a primary trickling filter circular in plan and a surrounding secondary trickling filter that is annular in plan. In the construction or arrangement just referred to the trickling filters are functionally separate. A circular wall or wire mesh for defining the outer marginal limits of the inner primary filter and the innermost marginal limits of the secondary trickling filter may be employed, but it is also possible to operate without an actual separating wall if the distributors on top of the tricklers and the underdrains are so arranged as to allow sufficient distance between the primary treatment zone and secondary treatment zone so that the intermingling of the liquids becomes negligible.

Furthermore, in order to attain a desired end for the invention hereof there has been devised and there is employed a single clarifier having a structural formation symmetrical in plan, preferably a clarifier having a bottom providing a sediment-receiving floor which is circular in plan and a marginal wall rising from said bottom and of which the circular floor portion is served by a single sediment-engaging and impelling mechanism that is turnable about a vertically-extending axis and which functions to rake circularly and progressively clean the bottom of the clarifier by engaging and impelling sedimented material engaged thereby towards and into a depressed portion or sediment-receiving sump provided in and by the bottom of the tank. The tank has suitable means leading from said sump for optionally passing from the clarifier sedimented material which has been passed to and into the sump as the result of the operating of the sediment-engaging and impelling means that functions over and with respect to the diverse portions of the floor or bottom of the tank. With this type of tank as a basis of a structure for providing the clarification area or liquid-holding region within the tank there has been incorporated and there is employed a vertically and transversely extending partial partition that is preferably disposed in substantial alignment with the vertical axis for the raking mechanism. This partial partition extends downwardly within the liquid-holding portion of the tank but terminates in a region sufficiently above the bottom of the tank to permit the repetitive passing the raking element or sediment-impelling mechanism referred to. This partition is relied upon to divide the tank into functionally separated primary and secondary clarifying compartments that are in constant hydraulic communication through passage area left below the partition.

In addition to the modifying of this clarifier by incorporating the partial partition as just referred to there is provided structure or means for defining a feed-receiving and distributing well or means for that section of the clarifier which is to function as a primary clarifier and also structure or means for defining a liquid-receiving and distributing well or means for that section of the clarifier which is to function as a secondary clarifier. In general the liquid within the primary compartment particularly the supernatant liquid within that compartment, may be referred to as the partially treated liquid because of the fact that it includes a substantial quantity of liquid which has been subjected to a certain degree of cyclic but partial biologic treatment in that portion of the system comprising the primary clarifier section and the inner or primary trickling filter. The liquid within the secondary clarifying section, particularly the supernatant liquid therein and passing therefrom, is relatively clarified and has been subjected to further biologic treatment because of further cyclic operation in that portion of the system comprising the secondary clarifier section and the outer secondary trickling filter.

The clarifier tank selected has a marginal launder around the upper edge therefor for receiving supernatant liquid passing thereinto and in order to adapt such a tank for effectively realizing the invention hereof the launder is divided by partitioning means or elements disposed therein so as to provide three distinct launder sections, of which one section that is sometimes referred to herein as a collecting section, is disposed so as to extend along only a portion of the marginal wall corresponding to the primary clarifier section; of which another section is sometimes referred to as a commingling section, is disposed so as to extend along the remaining portion of the wall corresponding to the primary section and also along a great portion of the marginal wall corresponding to the secondary clarifying section; and of which there is another or third section, sometimes referred to as an effluent section, disposed so as to extend along the remaining portion of the wall of the secondary clarifying section. These three sections are sometimes respectively referred to as primary collecting launder, the commingling launder, and the secondary effluent launder. As a matter of fact the relative length of these launders is determined by the degree of recirculation desired.

These three clarifying launder sections preferably have an overflow weir edge at the same elevation with the result that a portion of the supernatant liquid from the primary clarifier section overflows as partially treated liquid into the collecting launder; so that a portion of the supernatant liquid from the primary clarifier section overflows as partially treated liquid into the commingling launder while a portion of relatively clarified supernatant liquid from the secondary clarifier section flows into said launder whereby it is commingled with the partially treated supernatant liquid received in that launder; and so that there is a flow of supernatant liquid from the secondary clarifier section into the effluent launder which is provided for permitting a release of clarified or fully treated effluent from the system in quantity corresponding to that of the feed liquid supplied to the system for treatment as will hereinafter more fully appear. The arrangement and subdividing of the marginal launder of the clarifier tank as just referred to permits the different sections to be respectively connected in cyclic arrangement with the primary trickling filter and the secondary trickling filter whereby a progressive and continuous type of biologic treating process can be carried out in an effective and efficient manner.

It should be noted that it is possible to set the level of the overflow weir of the effluent section slightly higher than the level of the weirs of the other launder sections so as to create a slight backwash under the dividing baffle between the two compartments in the direction from the secondary compartment to the primary compartment so as to counteract any tendency for untreated waste to pass under the baffle from the primary to the secondary compartment before the system has reached complete hydraulic balance. It is also possible to accomplish the same purpose by maintaining a constant and somewhat higher rate of flow in the secondary treatment part of the system than the maximum rate of flow in the primary treatment part of the system.

The various features of the invention and the diverse aspects and objects thereof are particularly concerned with the novel construction of a clarifying tank or unit when made or constructed so as to embody the features of construction just referred to and also with the manner in which this particular or specifically constructed clarifying tank or unit is brought into operative arrangement and combination with respect to the primary and secondary trickling filters referred to.

The invention possesses other objects and features of advantage some of which will be further brought out and will be set forth more in detail in the description which follows:

In the following description and in the claims parts will be identified by specific names for convenience but they are intended to be as generic in their application to similar parts as the art will permit.

In the accompanying drawings which constitute a part of this specification there have been illustrated the best and most characteristic embodiments of the invention known to the undersigned but such embodiments are to be regarded as typical only of other possible embodiments and the invention is not to be limited thereto.

In said drawings:

Figs. 1 and 2 are respectively plan and vertical views diagrammatically illustrating a system for realizing the invention hereof and embodying a two compartment round clarifier tank in operative association and arrangement with concentrically arranged biologic trickling filter beds. In the form of these figures the top of the tank is at a sufficiently higher elevation than that of the biologic beds to permit gravity flow from the clarifiers to the biologic beds. Also the pipe lines from the launders of the clarifying tank are indicated as entering the top of the distributor over the trickling filters while in certain of the later drawings these lines enter the distributor from underneath through a hollow center column.

Figs. 3 and 4 are respectively plan and vertical views illustrating in more detail a form of system which is functionally substantially the same as that of Figs. 1 and 2 except according to this second form the bottoms of the filter beds are at a sufficiently higher elevation than that of the top of the clarifier tank to permit gravity flow from the beds to the clarifiers, also the feed lines to the distributor on the biologic filters are indicated as entering from underneath through a hollow center column.

In Fig. 3 parts of the trickling filter have been broken away to show the sumps and piping arrangement at the bottom portion of the trickling filter construction. In connection with this figure it will be noted that two basins or wells appear in the foreground, namely, at one side of the clarifier tank and the concentric filter beds.

In Fig. 4 the two compartment or divided clarifier tank and the concentric trickling filters appear, in general as vertical sectional views taken as on the plane indicated by the line 4—4 of Fig. 3, while the basins or wells appear as vertical sectional views taken as on the plane indicated by the line 5—5 of Fig. 3.

Fig. 5 is a vertical view, partially in vertical section, illustrating the manner whereby a low pipe conveys liquid for ultimate delivery and distribution over the inner filter bed while a higher pipe conveys liquid for ultimate delivery and distribution over the outer or surrounding filter bed.

Fig. 6 is a view in vertical section showing in detail the construction of the parts in the region whereat liquid is passed from certain stationary rising pipes to and in the suitably supported rotatable liquid distributing means for the trickling filter. It is obvious that the two concentric compartments in this distributor head could equally well be fed from the top from two stationary pipes each entering into one of the rotating compartments.

Figure 7:
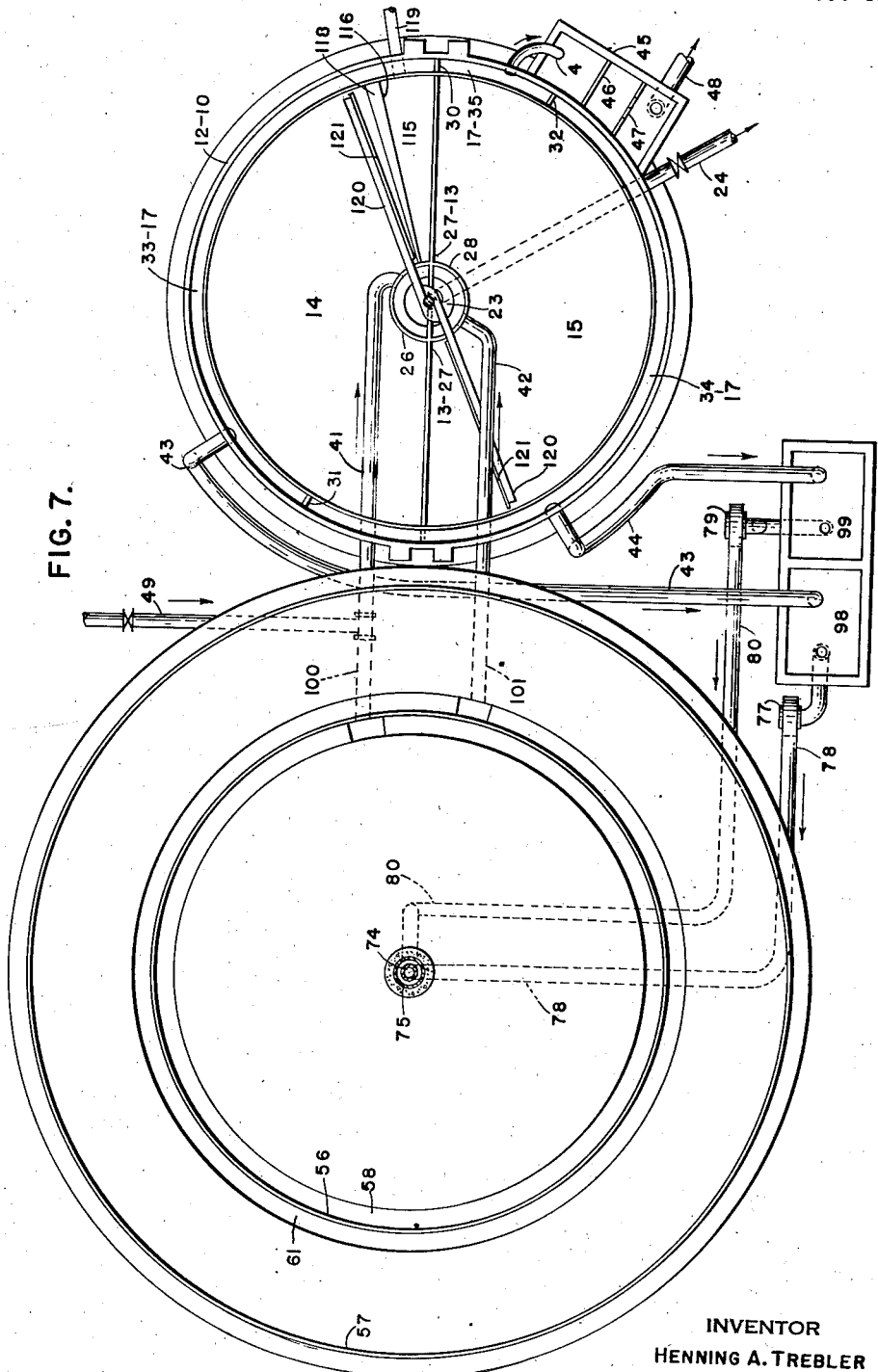

Fig. 7 is a plan view of the system also shown in plan in Fig. 3 but in Fig. 7 the superstructure of the clarifier tank, the rotary liquid distributing means for the concentric trickling filters, the beds of discrete material therein, and the latticed floor for the beds have been omitted.

Figs. 8 and 9 are respectively plan and vertical sectional views illustrating a system for realizing certain features or aspects of the invention hereof and according to which a rectangular clarifier tank that is divided into primary and secondary compartments or sections by a longitudinally-extending partial partition is shown in operative association with concentrically arranged primary and secondary biologic trickling filter beds. Fig. 9 is a sectional view taken as on the vertical planes indicated by the broken line 9—9 of Fig. 8. The bodies of discrete material providing the biologic trickling filter beds and indicated in Fig. 9 have been omitted from Fig. 8.

Figs. 10 and 11 are respectively vertical front and transverse views showing the details of construction of adjustable weir plates provided at and for certain of the launder or trough sections of the tank.

Figs. 12 and 13 are respectively plan and vertical sectional views illustrating a system for realizing certain features or aspects of the invention hereof and according to which a rectangular clarifier tank that is divided by a transversely-extending partition into primary and secondary compartments or sections is in operative association with concentrically arranged primary and secondary biologic trickling filter beds. Fig. 13 is a sectional view taken as on the vertical planes indicated by broken line 13—13 of Fig. 12.

In the systems as illustrated by Figs. 1 to 7 the clarifier tanks are shown as round tanks that are circularly raked. It will be borne in mind, however, that these tanks might be of other formation, as, for example, square or of some other form equilateral in form while the system of either Figs. 8 and 9 or of Figs. 12 and 13 is shown as having tanks which are rectangular in plan.

In the system shown in Figs. 8 and 9 the two sections of the clarifier tank are served by a single raking mechanism common to both sections.

In the system shown in Figs. 12 and 13 no raking mechanism is necessarily employed and the clarifier construction is shown having a bottom formation with sufficient downward slope whereby sedimented material can gravitate or slide to the lowermost interior portion or sump sections of the tank without the necessary employment of raking mechanism. This remark applies to the system of Figs. 14 to 16 inclusive.

Figs. 14, 15 and 16 are views illustrating a system for realizing certain features or aspects of the invention hereof. By these views there is illustrated a system embodying a rectangular clarifier tank functionally divided by a transverse partition in primary and secondary compartments and associated primary and secondary trickling filter beds. As to the clarifier tank the launder for receiving incoming feed and primary filter effluent is at one end of the tank, the launder for receiving the secondary filter effluent is at the other end of the tank while the collecting, commingling and effluent launder sections are proximate the transverse partition in the central portion of the tank. Fig. 14 is a plan view of the system. In Fig. 15 the rectangular clarifier tank is illustrated by a vertically-extending longitudinal view while the trickling filters are shown in vertical section. In Fig. 16 the features of the system are illustrated by vertical exterior view, the clarifying tank being illustrated by a vertical end view partially broken away. Fig. 17 is a vertical view primarily in section illustrating a manner which liquid flowing by gravity from the launder of the clarifier tank can be delivered into the rotary distributing means for the trickling filters.

Figs. 18 to 23 are flow-sheets or indicative systems outlining how relative automatic operation for the systems hereof can be attained.

Figs. 18 and 19 respectively indicate in plan and in vertical views an arrangement in which there are gravity flows from the clarifiers to the trickling filters and a constant flow to the clarifiers.

Figs. 20 and 21 respectively indicate in plan and vertical views an arrangement in which there are gravity flows from the trickling filters to the clarifiers. Here the feed enters a pump pit and the arrangement is useful where the feed is relatively free of suspended matter.

Figure 22:
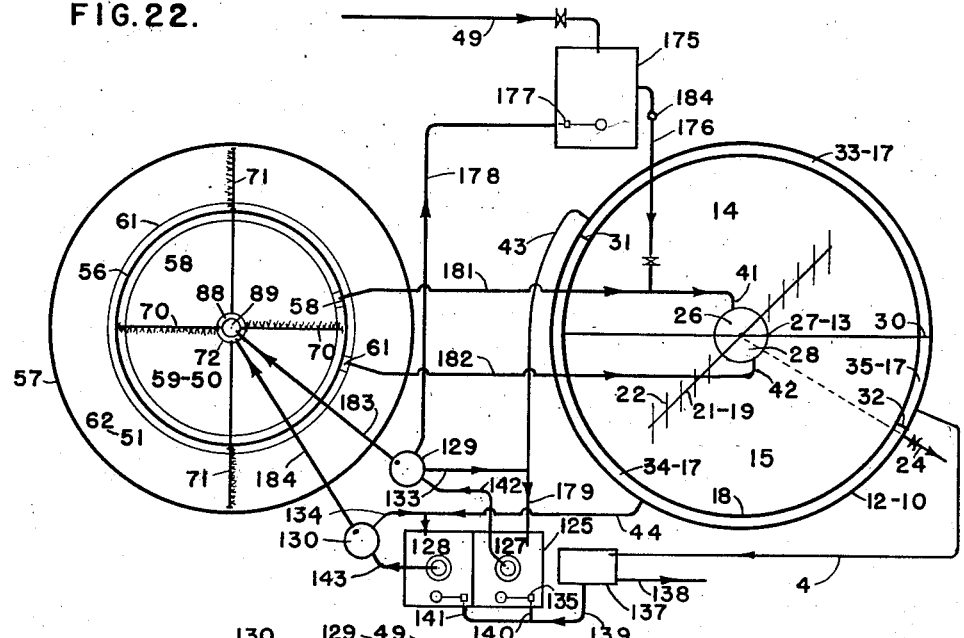
Figure 23:
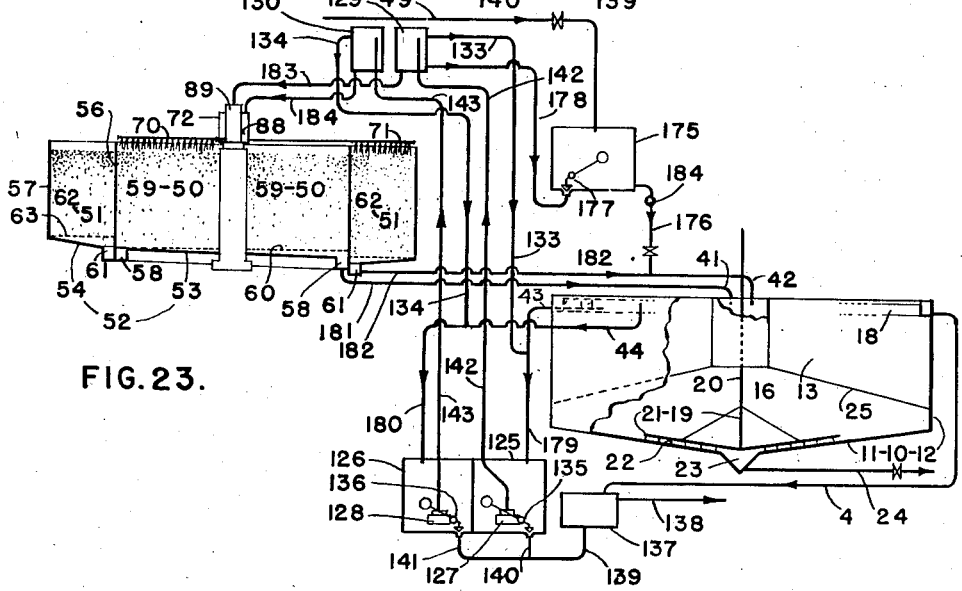

Figs. 22 and 23 respectively indicate in plan and vertical views an arrangement in which there are gravity flows from the trickling filters to the clarifiers and the feed enters a primary clarifier.

Reference is now made to the drawings in detail and in this connection there will first be described the systems illustrated in Figs. 1 to 7 inclusive and certain modes of operation carried out therein.

Each system of these figures embodies a circular clarifying tank 10 having a bottom 11 and a marginal wall 12 rising therefrom. The liquid-holding portion of the tank is functionally divided by vertically-extending partial partition 13 into the primary and secondary compartments respectively numbered 14 and 15 and which are in constant hydraulic communication through a passage area 16 below the partition. The tank has a liquid-receiving launder 17 extending along the upper portion of the marginal wall and an overflow edge section 18 of the launder determines the normal surface level of the liquid in the tank.

The tank is equipped with a sediment-engaging and impelling mechanism 19 that is turnable about a vertically-extending axis 20 centrally disposed with respect to the tank. This mechanism comprises arms 21 extending outwardly from the axial portion of the mechanism. These arms have raking blades 22 that provide sediment-engaging and impelling elements that function over diverse sections of the circular floor or bottom 11 of the tank and serve to impel sediment engaged thereby towards and into a sediment-receiving sump 23 from which the transferred sediment is outwardly passed according to operative requirements through a valve-controlled discharge conduit 24.

The partial partition extends downwardly into and within the liquid-holding portion of the tank for a sufficient depth to functionally separate the beds of liquid undergoing clarification treatment in the primary and secondary zones 14 and 15 of the clarifier, but the lower edge portions 25 of this partition terminate above the bottom of the tank not only so as to leave the passage area for providing constant hydraulic communication between said primary and said secondary bodies of liquid, but also sufficiently above the floor or bottom 11 of the tank to permit the passage of the rake arms 21 incident to the functioning thereof.

For and at each side of the partition and in the upper central portion of the tank there is provided a liquid-receiving and distributing means or portion in the form of an open bottom well for feed liquid passed thereto. For the primary compartment or zone 14 the open-bottom well is provided within and by a semi-circular shell member or section 26 that is connected to the plate portions 27 of the partial partition in a manner whereby there is realized a construction which is sometimes termed herein and referred to as a feed-receiving and distributing means or portion for the primary compartment. At the other side of the partial partition a second semi-circular shell member or section 28 is connected to the plate portions 27 of the partial partition thereby providing that which is sometimes referred to as the liquid-receiving and distributing means or portion for the secondary compartment.

Having in view the terseness of language or ease of identification of certain parts, it is here pointed out that the structure or portion herein referred to or comprehended by the expression feed-receiving and distributing means or portion for the primary compartment of the clarifying tank is sometimes referred to as primary clarifier feed well, and the structure or portion herein referred to by the expression liquid-receiving and distributing means or portion for the secondary compartment of the clarifying tank is sometimes referred to as secondary clarifier liquid distributing well.

As to the launder 17, that is functionally divided by three cross members 30, 31 and 32. These cross members are preferably in the form of adjustable or postionable partitions or dividing elements. These dividing elements or launder partitions functionally divide the launder as a whole into three sections respectively numbered 33, 34 and 35. Section 33, which is shown by the drawings as of intermediate length, extends along a portion of the marginal wall of the primary zone. This launder section 33 is sometimes referred to herein as a collecting launder for receiving partially treated supernatant liquid from the primary clarifier compartment 14. Section 34, which is shown by the drawings as being the longest, has a portion which extends along a portion of the marginal wall of the primary clarifier compartment and a portion which extends along a portion of the marginal wall of the secondary clarifier compartment. This launder section 34 is sometimes herein referred to as a commingling launder because of the bringing together therein of some of the partially treated liquid from the primary zone or compartment 14 and a larger quantity of a relatively clarified liquid from the secondary zone or compartment 15. Section 35, which is shown by the drawings as being the shortest, extends along a portion of the wall of the secondary clarifier compartment 15. This launder section 35 is sometimes referred to as an effluent launder that receives relatively clarified supernatant liquid from the secondary clarifier zone or compartment. It is from this launder 35 that treated liquid is released from the system as relatively clarified effluent. It is to be noted, however, that 33 and 35 might be of the same length if recirculation of 2:1 were desired. If no recirculation were desired the commingling section could be eliminated. As the cross members 30, 31 and 32 are adjustable or positionable according to the will of an operator, it will be manifest the effective and relative length of the launder sections 33, 34 and 35 can be varied.

Means comprising a pipe or conduit 41 is provided for passing feed or primary filter effluent into the feed-receiving and distributing well 26 of the primary clarifier compartment. Means comprising a pipe or conduit 42 is provided for passing secondary filter effluent into the liquid-receiving well 28 of the secondary clarifier compartment. Means comprising a pipe or conduit 43 leads from the collecting launder section and constitutes a part of the means for passing overflowed partially treated supernatant liquid from the collecting launder section 33 and for delivering the liquid passed thereby to and for ultimate distribution over the biologic bed of the central or primary trickling filter. Means comprising a pipe or conduit 44 leads from the long commingling launder section 34 and constitutes part of a means for passing therefrom commingled liquid (liquid comprising a minor portion of overflowed supernatant liquid of the primary clarification compartment and a major portion of overflowed supernatant liquid from the secondary clarifier compartment) and for delivering the commingled liquid thus passed thereby to and for ultimate distribution over the biologic bed of the surrounding secondary trickling filter. Means comprising a pipe or conduit 4 leads from the short effluent launder section 35. In the more detailed disclosure of Figs. 3 and 7, this pipe 4 delivers effluent liquid into a release box 45 for measuring and sampling the flow having underflow baffle 46 and an overflow baffle or measuring weir 47 and a discharge pipe 48 leading from the box and which is provided for releasing as overflow passing the weir 47 a quantity of liquid equal or corresponding to the quantity of liquid supplied to the system for treatment, as for example, through the feed pipe 49 leading to and delivering into the pipe or conduit 41.

As to the concentric trickling filters, these are provided by an inner primary trickling filter 50 and an outer secondary trickling filter 51 immediately surrounding the inner filter. The trickling filters have as a part thereof a containing structure embodying a bottom 52 providing a sloping inner floor or bottom section 53 for the primary filter, an outer annular sloping floor or bottom section 54 for the secondary filter, a hollow or solid central pier section 55, and an outer cylindrical retaining structure or wall 57 concentric with the pier rising from the outer edge portion of the bottom section 54. The floor or bottom section 53 for the primary filter has an annular or other suitably formed sump 58 for receiving effluent from a biologic bed 59 of discrete material that provides the biologic treating bed for the primary filter 50. This bed 59 is suitably supported on a latticed or other suitable type of floor 60 to pass from the bed to the underlying sloping floor or bottom section 53 and thence into the sump 58 corresponding thereto. In the construction as shown there is indicated a cylindrical wall or intermediate member 56 concentric with the pier. This intermediate member 56 is shown as rising from the bottom 52, namely, from a region thereof intermediate or constituting merging sections of the inner primary and the outer secondary bottom sections 53 and 54. A solid wall structure is not necessarily needed at this location, as a matter of fact in the preferred arrangement no physical dividing wall is employed and sufficient separation of the primary and secondary treatment liquids is maintained simply by allowing sufficient distance between the primary and secondary distributing members on top of the filter and between the corresponding primary and secondary collecting launders or underdrains.

The floor or bottom section 54 of the secondary trickling filter has an annular or other suitably formed sump 61 for receiving the trickling effluent from the secondary filter bed 62 of discrete material that provides the biologic treating bed for the surrounding trickling filter 51. This bed is suitably supported on a latticed or other suitable type of floor 63 whereby trickling effluent from the secondary bed can readily pass to the underlying sloping floor or bottom section 54 and ultimately into the sump 61 corresponding thereto.

From that which has preceded, it will be manifest that the construction of the concentrically arranged trickling filters 50 and 51 is such that they are functionally separated.

From the drawings it will be seen that a set of spray and distributing short tubular arms 70—70 supplies and distributes liquid received thereby to and over the circular biologic treating bed 59 of the primary inner trickling filter 50 while a set of spray and distributing long tubular arms 71—71 supplies and distributes liquid received thereby to and over the annular biologic treating bed 62 of the secondary or surrounding trickling filter 51. These tubular distributing arms are carried by and extend from a horizontally-turnable carrying structure 72 that derives support from a fixed supporting bearing member 73 mounted upon the stationary centrally located pier 55.

Referring now particularly to the system as illustrated more in detail in Figs. 3 to 6, it will be seen that the stationary bearing member 73 has associated therewith and extending therethrough a stationary rising inner pipe 74 and a larger stationary rising pipe 75 surrounding the inner pipe 74. This larger outer pipe 75 has a closed bottom or cap member at 76 to complete or provide a liquid-tight construction at the lower end thereof.

The system of the figures just referred to has means for passing partially treated effluent from the collecting launder 33 into the rising inner pipe 74 through pipe 43 that delivers into the well or basin 98, a pump 77 having an intake connection leading from the interior of the basin, and a low pipe section 78 leading to and delivering into the rising inner pipe 74. The same system also has means for passing commingled or mixed liquid from the commingling launder 34 through pipe 44 that delivers into a well or basin 99, a pump 79 having an intake connection leading from the interior of the basin 99, and the higher pipe section 80 leading to and delivering into the rising outer pipe 75. The liquid supplied and passed from the primary collecting launder 33 is delivered from the rising inner pipe 74 whereby it is ultimately passed into the short tubular distributing arms 70 that are disposed for operation over the primary trickling filter bed 59 while the liquid supplied and passed from the commingling launder 34 is delivered from the rising outer tube or pipe section 75 whereby it is ultimately passed into the long tubular distributing arms 71 that are disposed for operation over the annular secondary trickling filter bed 62.

The delivery of liquid from the rising inner pipe 74 and from the rising outer pipe section 75 respectively into the short distributing arms 70 and the longer distributing arms 71 will now be referred to. The horizontal tubular carrying structure 72 by which said distributing arms are carried comprises a turnable bearing member 82 preferably resting upon anti-friction roller members or balls 83 and having axial engagement with the aforementioned stationary member 73. Said carrying structure includes a casing supported on and by said turnable bearing 82 and embodies a bottom 84 with three concentric tubular sections 85, 86 and 87 rising therefrom. The casing is thus constructed so as to provide in concentric arrangement outer and inner liquid-receiving wells 88 and 89 that are annular in plan. The outer annular well 88 receives liquid delivered thereto from the rising inner pipe 74 through branch pipes 90 leading from the latter. The inner annular well 89 receives liquid delivered thereto from the rising outer pipe 75 after passing an overflow tip member or portion 91 of the latter. It is obvious that the annular liquid-receiving wells 88 and 89 need not be fed from underneath but can equally well be fed from two overhead lines, one entering feed well 88 and another entering feed well 89. If this alterntive arrangement is used, the center pier can be made solid and one of the central stationary pipes 86 or 87 extended up for support of the overhead feed pipes. Such construction is illustrated in Fig. 17.

From the drawings it will be noted that the short pipes or tubular arms 70 for distributing liquid on and over the primary filter bed are in communication with the outer annular well 88 and extend from the lower portion of the outer rising tubular section 85. It will also be noted that the long pipes or tubular arms 71 for distributing liquid on and over the secondary filter bed are in communication with the inner annular well 89 and extend from the lower portion of the intermediate rising tubular section 86.

Suitable tension rods as 92, 93 and 94 extend from the upper portion of the outer rising tubular section 85 whereby the outlying portions of distributing pipes or arms 70 and 71 receive any necessary and further carrying support from said rising tubular section 85 of the carrying structure 72. This rotary distributing means or rotary distributing head, as it may be called, and which embodies and includes said carrying structure 72 and said distributing arms 70 and 71, is free to turn and is caused to turn about the vertically-extending axis therefor due to the reaction which takes place incident to the outflow of liquid that is distributingly delivered from the free end portion of said arms with the result that the arms move in circular horizontal paths in the general directions indicated by the arc-shaped arrows shown in Fig. 3.

In the arrangement of Fig. 4 each of the trickling filter beds 59 and 62 is at elevation higher than that of the upper portion of the two compartments of the clarifier tank and in connection with this figure it will be readily noted that effluent trickling from the primary filter bed 59 passes downwardly through the latticed floor 60 to and upon sloping bottom 53 and therefrom it flows into the annular trough portion or sump 58 from which the filter effluent passes—by gravity flow—through the pipe or conduit 100 and from the terminal portion or section 41 thereof into the feed-receiving and distributing well 26 of the primary clarifier compartment. Effluent trickling from the secondary filter bed 62 passes downwardly through the latticed floor 63 to and upon the sloping bottom 54 and therefrom it flows into the annular trough portion or sump 61 from which it passes—by gravity flow—through the pipe 101 and from the terminal portion or section 42 thereof into the liquid-receiving and distributing well 28 of the secondary clarifier compartment.

In Figs. 3 and 4 a truss or bridge 104 carried from the marginal wall of the tank provides a walkway 105. It also affords structure for supporting the sediment-engaging and impelling mechanism 19 referred to, and the mechanical supporting and actuating mechanism therefor. The sediment-engaging and impelling mechanism 19 which has heretofore been referred to, as to the fundamental details thereof, includes a vertically-extending rotatable shaft 106 from the lower end of which there is carried and through the medium of which there is actuated the outwardly-extending arms 21 having bladed impelling elements provided by rake blades 22 extending downwardly from the arms. This shaft 106 is carried and is actuated through mechanism indicated as to location at 107 through the medium of a motor and speed reducing mechanism the location of which is indicated at 109. The details of construction by which this shaft is carried and actuated are not shown and described in detail herein since the structure therefor is common and well known; a typifying type of such construction is shown and described in the Scott Patent No. 2,087,725, granted July 20, 1937.

The arrangement and piping hook-up for the two compartment tank, and particularly of the feed and liquid-receiving and distributing wells 26 and 28 and of the three-section marginal effluent launder thereof with the concentric trickling filter beds are functionally substantially the same for both the system as diagrammatically illustrated in Figs. 1 and 2 and the system illustrated in greater detail in Figs. 3 to 6. Nevertheless, it will be noted, as has already been pointed out, that there is one main point of structural difference between them which it is well to mention at this time.

In Figs. 1 and 2 the diagrammatic illustration indicates the system where the tops of the two concentric clarifier tanks are at elevation higher than that of the tops of the primary and secondary trickling filter beds. In other words, the marginal launder sections of the two compartment tank are at elevation sufficiently high whereby there can be attained and realized a gravity flow of partially treated clarified liquid from the collecting section 33 of the marginal launder to and upon the bed of the primary filter bed 59 and whereby there can be realized a gravity flow of mixed liquid from the commingled launder section 34 to and upon the top of the secondary trickling filter bed 62. With such an arrangement it follows that there must be provision (a) for the pumping of primary filter effluent from the primary filter trough or sump 58 to and into the feed-receiving and distributing well 26 of the primary clarifier compartment and (b) for the pumping of secondary filter effluent from the secondary filter trough or sump 61 to and into the liquid-receiving and distributing well 28 of the secondary clarifier compartment. This end is attained (a) by incorporating a pump 110 in the line 100 leading from the sump 58 of the primary trickling filter which line 100 has and includes the delivery or terminal section 41 that leads to and delivers into the primary feed-receiving and distributing well 26, and (b) by the incorporating of a pump 111 in the line 101 leading from the trough or sump section 61 of the secondary filter, which line 101 has and includes the delivery or terminal section 42 that leads to and delivers into the secondary liquid-receiving and distributing well 28.

In the form or system illustrated by Figs. 1 and 2 or by Figs. 3 to 7 inclusive the supply of incoming feed 26 is by a feed pipe 49 that delivers into the terminal section 41. The liquid within the primary clarifier compartment or section 14 undergoes relatively quiescent sedimentation therein and a major portion of the supernatant liquid thereof progressively passes into the collecting launder section 33, thence into the conveying means that includes the pipe section 43 and by said means the liquid undergoing transfer is ultimately passed to and into the short distributing arms 70 from which it is delivered to and upon the upper surface of the primary biologic treating bed 59. The effluent from this bed is correspondingly conveyed back to the primary feed-receiving and distributing well 26 whereby most of the returned liquid undergoes a repetitive cyclic treatment. A portion of the supernatant liquid from the primary compartment—only a minor portion thereof—enters the commingling launder 34. Therein it mixes with a major portion of the supernatant liquid flowing into that launder from the secondary clarifier compartment. This mixed liquid enters the transferring means therefor that includes the pipe section 44 and by said means the mixed liquid undergoing transfer is ultimately passed to and into the long distributing arms 71 from which it is delivered to and upon the upper surface of the secondary biologic treating bed 62 through which it passes. From this bed the trickling effluent collects in the trough or sump 61 and therefrom it is transferred or passed into the liquid-receiving and distributing well 28 in the secondary compartment whereby it, or at least a major portion of the returned liquid, undergoes repetitive cyclic secondary treatment. As the system functions there is a release of a quantity of supernatant liquid into the effluent or short launder section 35, namely, a release of outflowing clarified liquid along the pathway or pipe 4. The average quantity of liquid thus released from the system along the pathway 4 equals and corresponds to the average quantity of liquid that is supplied as incoming feed along and through the pipe or conduit 49 for treatment in the system.

This description as to the mode of operation of the system described is of a general character and is indicative of the type of treatment which is carried out in the systems illustrated, this regardless of whether the clarifier or concentric trickling filters are at the higher elevation, or as otherwise expressed it is immaterial as to the operative functioning of the system whether there is a gravity flow of liquid from the clarifier to the trickling filters as is indicated by the arrangement of Figs. 1 and 2 or whether there is a gravity flow of filter effluent into the clarifier as is indicated by the arrangement of Figs. 3 to 7. If one desired he could arrange for pumping both to the clarifiers and to the trickling filters and not rely upon any gravity flow but obviously this is something one would not have to use very often.

In connection with the treatment of some liquids such as domestic sewage there is encountered as an objectionable feature thereof floatable matter in the form of scum or grease which rises and collects on the top of the liquid within the clarifier tank. This scum is preferably removed by mechanical means associated with the sediment-raking mechanism 19. To accomplish the desired end there is installed a stationary open-top scum-receiving hopper or trough 115 that extends radially within the tank. This hopper has as one vertical radial wall thereof an upper portion of the plate 27 of the partial partition 13. It has as another vertical radial wall a plate member 116 and it has for the bottom thereof a downwardly and outwardly sloping member 117. The hopper also has an upwardly inclined platform or ramp 118 leading to the scum-receiving section thereof. A discharge pipe or conduit 119 leads from the lower interior portion of the hopper through the marginal wall 12 of the tank to the exterior of the latter. A horizontally-turnable scum scraper is provided by an arm 120 extending radially from the vertical shaft 106, or as otherwise expressed from the vertically-extending axial member at 20 and it includes a scum-scraping blade provided by a flexible strip 121 extending downwardly from the arm to an elevation lower than that of the overflow edge 18 of the marginal launder 17. In other words, depending flexible strip 121 dips into the liquid within the tank and has sufficient yielding characteristics whereby it can not only convey scum upwardly along the ramp 118 into the hopper but whereby it can pass the upper portion of the plates 17 of the transversely-extending partial partition 13 as the raking mechanism turns in circular paths in the region below the partitions.

In the construction shown this hopper is provided within the primary zone 14 of the clarifier. It will be manifest that a second hopper could be similarly embodied in the secondary zone 15 of the clarifier. In general, however, one hopper is sufficient for the clarifier and only one hopper would be employed unless some particular engineer or operator should desire the employment of a scum-receiving hopper for each compartment or section of the plural compartment clarifier.

*Rectangular tanks and systems of Figs. 8 to 13 inclusive*

While the invention has been described in conjunction with a round or equivalent type of clarifier tank, nevertheless, certain important or fundamental features or aspects of the invention are realizable in and by systems according to which there are employed clarifier tanks that are rectangular in plan and which are divided by suitable partitioning means into functionally separated primary and secondary clarifier compartments that are in constant hydraulic communication through submerged passage area provided for that purpose because of the partitioning means being only of the partial partition type. An important feature of such a rectangular clarifier is the provision of suitable distributing means for both feed and returned liquid as the case may be to the respective primary and secondary compartments or sections of the tank and also the inclusion of that which may provide a primary collecting launder for the primary section, a commingling launder or composite launder means that receives supernatant liquid from both sections or compartments of the tank, and an effluent launder that receives supernatant liquid from the secondary section of the tank and from which clarified supernatant liquid passes as effluent from the tank, or, as otherwise expressed from the system wherein the tank is employed.

In the system of Figs. 8 and 9 the partial partitioning means that divides the tank into functionally separate clarifier sections extends longitudinally of the tank whereby the primary and secondary clarifier sections of the tank are parallel and longitudinally-extending sections that are arranged side by side. These paralleling sections are in constant hydraulic communication with submerged passage area below the partial partitioning means and extending for the full length of the interior of the tank. As the floor or bottom of the tank is relatively flat there is provided conveying means which includes longitudinally-extending chain elements having transversely-extending flights or scrapers carried by the chains, which flights or scrapers practically extend from one side of the tank to the other and function to scrape and transfer sedimented material to a sump or depressed sediment-receiving section preferably located at the feed-receiving end of the tank.

In the system of Figs. 12 and 13 and in the system of Figs. 14 to 17 the partial partition in the tank extends transversely thereof. Depressed or downwardly sloping floor sections are provided below and for each of the clarifier compartments or sections and because of the downwardly sloping character of said floor sections sedimented material lodged thereupon slides to the bottom of the sumps thus provided whereby no raking mechanism need be employed within and for the tank.

The trickling filter constructions of Figs. 1 to 7 have been described in detail. The trickling filter constructions of Figs. 8 and 9, Figs. 12 and 13 and Figs. 14 to 17 are substantially identical with that of Figs. 1 to 7. Like reference characters indicate like parts, particularly like functioning parts. Since the same or like reference characters appear on the filters of Figs. 8 and 9, Figs. 12 and 13, and Figs. 14 to 17 as appear upon the filters of Figs. 1 to 7, and since the filters are all functionally and structurally substantially the same, no further description with respect to the filters of Figs. 8 and 9, Figs. 12 and 13, or of Figs. 14 to 17 is necessary or advisable. Such being the case, this leaves as requiring further description of only the rectangular clarifier constructions illustrated by Figs. 8 to 17 inclusive and their hook-up to the biologic trickling filters corresponding thereto.

*Rectangular clarifier of Figs. 8 and 9*

The rectangular clarifier tank 210 of Figs. 8 and 9 has a bottom or floor the major portion 211 of which is relatively flat and it comprehends a depressed minor portion 216 that provides a sump or sediment-receiving section 217, the latter of which is preferably located at the feed-receiving end of the tank. From this bottom there rises the marginal wall portion of the tank and which comprises a transversely-extending wall section 212 at the feed-receiving end of the tank, a transversely-extending wall section 213, at the discharge end of the tank, and longitudinally-extending side wall sections 214 and 215. The tank also has a longitudinally-extending partial partition 227 that extends the full length of the tank and downwardly within the tank, but so that the lower edge 225 thereof is spaced somewhat above the floor portion 211 whereby a submerged passage area is left through which liquid bodies at opposite side of the partition 227 are in constant hydraulic communication with each other. This partition 227 thus divides the tank into parallel longitudinally-extending compartments or sections of which a section designated 14 is referred to as a primary clarifier compartment, while that section designated 15 is referred to as the secondary clarifier compartment. This longitudinal partition 227 has upward extent to the upper margins of the tank except for interruptions thereof provided because of certain launder structures hereinafter referred to.

At the head or feed-receiving end of the tank there is provided a feed-receiving trough section 226 into which incoming feed is introduced by the pipe 49—some returned effluent from the primary section of the trickling filter also enters this trough through the medium of pipe 41. The liquid thus supplied to this feed-receiving trough 226 passes a weir edge 2 thereof and enters a downflow distributing section provided at 221 because of a downwardly-extending baffle 219. Also at the head end of the tank and at the other side of the partial partition 227 there is a second receiving trough 228 into which some returned effluent from the secondary section of the trickling filter is delivered by the pipe 42. The returned liquid thus supplied to the receiving trough 228 passes and enters a downflow distributing section provided at 220 and because of a downwardly-extending baffle member 218.

From that which has preceded, it will be noted that the primary feed-receiving trough 226 and the baffle member 219 associated therewith provides a feed-receiving and distributing means or portion for the primary clarifier section 14; and that the liquid-receiving trough 228 and associated baffle member 218 provides a liquid-receiving and distributing means or portion for the secondary clarifier section 15.

At the other end of the tank there is provided an arrangement of troughs or launder structures which are divided by positionable partitioning means or elements disposed so as to provide three launder sections that in fact furnish three distinct launder sections respectively designated 233, 234 and 235 and respectively referred to as a collecting launder, a commingling launder and an effluent launder.

The collecting launder 233 is of T formation. It functions to receive some supernatant liquid from the primary clarifier section 14. It has overflow edge portions provided at 253, 254, 255 and 256, each of which has adjustable weir edge member 2. For details of the adjustable weir edge members 2 see Figs. 10 and 11. Some supernatant liquid from the upper portion of the primary clarifier zone or section 14 normally overflows into this primary collecting launder 233 and is passed therefrom by the pipe 43 for ultimate distribution on the primary section 50 of the biologic trickling filter.

The commingling launder 234 is also of T formation. It is constructed for receiving therein some supernatant liquid from the primary clarifier section 14 and for receiving some supernatant liquid from the secondary clarifier section 15. This launder has overflow edge portions provided at 258 and 259 past which supernatant liquid from the primary clarifier section 14 flows into the launder and overflow edge portions 260, 261, 263 and 264 past which supernatant liquid from the secondary clarifier section 15 flows into the launder whereby there is a commingling therein of the two types of supernatant liquid passed thereinto. Each of the edge portions just referred to also has an adjustable weir edge member 2. In connection with the foregoing launders 233 and 234 it will be noted there is a barrier section 25S sufficiently high to prevent any direct flow from the launder 233 into launder 234 and vice versa. The liquid collected by the launder 233 passes therefrom through the pipe 43 on its way towards and for distribution ultimately over the primary section 50 of the biologic trickling filter. The commingled liquid within the launder 234 passes therefrom through the pipe 44 on its way towards and for distribution ultimately over the secondary section 51 of the biologic trickling filter.

The effluent launder 235 is embodied by a straight launder section having overflow edge portions 265 and 266 past which some supernatant liquid from the upper portion of the secondary clarifier section 15 can pass into the effluent launder 235. Supernatant liquid received in this launder passes as effluent from the tank, or from the system of which the tank constitutes a part, through the pipe 4. Each said overflow edge portion 265 and 266 is provided with an adjustable weir edge member 2. A barrier section 25S prevents any direct flow between launder 234 and launder 235.

From that which has already preceded and from the diagrammatic views of Figs. 8 and 9, it will be apparent that the tank of these figures is connected in cyclic arrangement with the trickling filter in substantially the same manner that the circular tanks of Figs. 1 to 7 are connected in cyclic arrangement with the biologic trickling filters corresponding thereto. It is also clear that the barrier sections 25S can be made positionable and placed in various locations so as to provide various weir lengths for the collecting launder, commingling launder and effluent launder according to the rate of re-circulation desired in the primary and secondary steps of treatment. It is also clear that as with the circular clarifier it is possible to adjust the rates of flow into and through the two compartments of the clarifier so that there will be no possibility of a short-circuiting flow of raw untreated waste from the primary treatment compartment to the secondary treatment compartment.

Tersely stated feed and primary filter effluent is passed by pipes 49 and 41 to feed distributing means or portion 226 of the primary clarifier section 14. Some supernatant liquid of the primary clarifier section 14 is received in the collecting launder 233 and is passed therefrom by the pipes 43—having a terminal section 80—a rising pipe 75, and distributing pipes 79 to the primary trickling filter section 50. The effluent from the primary trickling filter section is received in the collector trough or sump 58 thereof, is passed by pipe 100, pump 110 and delivery pipe 41 back into the feed-receiving trough 226 and distributing means of the primary clarifier section 14. Some of the supernatant liquid of the primary clarifier section overflows into the commingling launder 234 and at the same time some of the supernatant liquid from the secondary clarifier passes into the commingling launder 234. The liquid commingled therein is passed by pipe 44— having terminal section 78—into riser pipe 74 from which it is ultimately delivered into the distributing pipes 71 for the secondary filter section 51 of the biologic trickling filter. Effluent from this secondary trickling filter section collects in the collecting trough or sump 61 thereof and is conveyed by pipe 101, pump 111 and pipe 42 into the liquid-receiving trough 228 and distributing means of the secondary clarifier section 15. As previously pointed out, it will also be noted some of the supernatant liquid from this secondary clarifier compartment 15 overflows into the effluent launder 235 from which the supernatant liquid received therein passes as release effluent leaving the tank or system through the pipe 4.

Mention has been made of the overflow weir edge member 2 which has been employed in and as part of the different launders. This overflow weir construction is shown in detail in Figs. 10 and 11. For each trough or launder, as the case may be, this overflow construction may be employed. For the trough or launder there are rising masonry sections, to wit, as section 1 in which bolts 3 may be embedded for holding the vertically-adjustable weir plate or weir edge member 2. Each bolt has a nut 3' and it passes through a slotted portion 5 of the plate 2 whereby according to operative requirements the nut on the bolt can be employed to clamp the weir edge member 2 in any desired operative position therefor. This type of construction can be used not only for the launder or troughs of the rectangular tanks described as it is adaptable for employing in and for the circular type of tanks if such type of weir construction is desired therefor.

Reference has heretofore been made to the employment of sediment-raking mechanism for this tank. In the construction shown there is employed some suitably supported transversely-extending shafts, to wit, an upper shaft 241, and lower shafts 242 and 243. These shafts are equipped with suitable sprockets as 244, 245, 246, 247 and 248. A suitable driving means is provided for operating the sediment-raking mechanism. Said driving mechanism embodies a chain 249 that engages the sprocket 244 on shaft 241 for turning the latter. A second sprocket 245 on shaft 241 through the medium of a chain 250 and through the medium of a sprocket 246 on the lower shaft 242 turns the latter. The lower shaft 242 has sprockets 247 at each end portion thereof and the low shaft 243 has sprockets 248 at each end portion thereof. These sprockets 247 and 248 carry longitudinally-extending endless chains 6 that are mounted so as to move in the path indicated by the arrows as and when the shafts are caused to turn by the driving mechanism therefor. These endless chains 6 in turn support and carry transversely-extending scrapers or blades 7. These blades 7 extend substantially the full width of the interior of the tank; they extend through the space below the longitudinal partition 227 and function incident to the turning of the sprockets and consequent movement of the chains 6 to engage sediment on the bottom floor 211 of the tank and to impel sediment thus engaged towards and into the sump or receiving section 217. Sedimented material in the form of sludge is delivered from the tank, according to operative requirements, through the medium of the valve-controlled discharge pipe 224.

*Rectangular clarifier of Figs. 12 and 13*

This clarifier is designated as 310. It is rectangular in plan and is divided by a transversely-extending partitioning means, in the form of a partial partition 327, into a primary clarifier section 14 and a secondary clarifier section 15. The tank structure thus divided has two bottom sections 311 and 312 which are in the form of hollow inverted cones and from these bottom sections there rise transversely-extending end walls 314 and 315 and longitudinally-extending side walls 316 and 317. The partition 327 parallels the end walls 314 and 315 and extends only part way towards the bottom of the tank whereby the lower edge portion 325 has below it a discharge area by which the clarifier sections 14 and 15 are in constant hydraulic communication. The partition 327 rises to the upper margins of the tank structure whereby the upper liquid-holding portions of the tank are functionally separated.

At the primary clarifier side of this transversely-extending partial partition 327 there is provided a feed-receiving and distributing structure or means that includes the feed-receiving trough 326 and a vertically-extending baffle member 318 arranged for directing liquid passing the upper overflow edge 2 of the trough 326 downwardly into the primary clarifier zone 14 and in a manner whereby the thus downwardly directed liquid is distributed across the full width of that section of the tank. At the secondary clarifier side of the partition 327 there is a liquid-receiving and distributing means or portion therefor provided by a receiving trough section 328 and a transversely-extending baffle member 319 arranged for causing a downwardly directed movement of liquid overflowing the edge member 2. The baffle member 319 functions whereby the thus downwardly directed liquid is distributed within and across that section of the secondary clarifier zone 15 which is proximate or in the immediate region of the transversely-extending partition 327.

The tank is also provided with launder structures which are sometimes hereinafter referred to as a primary collecting launder 333 because of its receiving solely supernant liquid from the primary section 14; a commingling launder made up of the launder sections 334$^a$ and 334$^b$ and of which the section 334$^a$ is disposed for receiving some supernatant liquid overflowing thereinto from the primary clarifier zone 14 while section 334$^b$ thereof is disposed for receiving some supernatant liquid overflowing thereinto from the secondary clarifier zone 15. The other or effluent launder section 335 is disposed for receiving supernatant liquid from the secondary clarifier section and from this last mentioned launder the supernatant liquid received therein passes as effluent from the tank, or from the system employing the tank, through the pipe 4. The collecting launder previously referred to and which receives supernatant liquid from the primary tank has a pipe 43 leading therefrom by which the supernatant liquid received therein is ultimately delivered to and upon the primary section 50 of the biologic trickling filter. Effluent from this primary section of this biologic trickling filter is passed from the sump 58 thereof by the pipe 100, pump 110 and pipe 41 into the feed-receiving trough 326 previously referred to, to wit, into the trough into which the incoming feed is also delivered by the means of the pipe 49. The liquid from the commingling launder sections 334$^a$ and 334ᵇ passes into a pipe 44 wherein these two types of liquid commingle and from which the commingled liquid is ultimately delivered to and over the secondary section 51 of the biologic trickling filter.

The trickling filter effluent from the secondary section 51 of the biologic filter is passed from the sump 61 thereof by pipe 101, pump 111 and pipe 42 into the liquid-receiving and distributing means that comprises the trough 328 for the secondary clarifier compartmtent 15.

From that which has preceded, it will be manifest how this tank is connected in cyclic arrangement with the trickling filter. It has also been pointed out that no raking mechanism is employed for this tank 310 and that sedimented material from either the primary or secondary clarifier compartments 14 or 15, as the case may be, settles into the lowermost portion of the inverted conical sections. The sedimented material which is in the form of sludge can be passed therefrom through the medium of the valve-controlled pipes 324ᵃ and 324ᵇ according to operative requirements.

*Rectangular clarifier of system of Figs. 14 to 17 inclusive*

This clarifier, designated 410, is rectangular in plan and is divided by a transversely-extending partitioning means, in the form of a partial partition 427, into a primary clarifier section 14 and a secondary clarifier section 15. The tank structure thus divided has two bottom sections 411, 411 for and corresponding to the primary clarifier zone 14 and two bottom sections 412, 412 for and corresponding to the secondary clarifier section 15. Each of the sections 411 and 412 just referred to is in the form of a hollow inverted cone and has a valve-controlled pipe 424ᵃ or 424ᵇ, as the case may be, by which sedimented material in the form of sludge can be passed from these inverted cones or depressed sections, according to operative requirements. In this connection, it will be noted that the sloping floors for these inverted cone-shaped sections constitute sediment-receiving sumps having a sufficiently sharp slope or inclination whereby no mechanical raking means is necessary or required for this clarifier. From the bottom of the tank which is thus formed or provided by the inverted cone structures there rise transversely-extending end walls 414 and 415 and longitudinally-extending side walls 416 and 417. The partition 427 parallels the end walls 414 and 415 and extends only part way towards the bottom of the tank whereby the lower edge portion 425 thereof has below it a discharge area by which the clarifier sections 14 and 15 are in hydraulic communication. The partition 427 rises to the upper margins of the tank structure whereby the upper liquid-holding portions of the tank are functionally separated.

At the end wall 414 of the primary clarifier section or zone 14 there is provided a feed-receiving and distributing structure or portion that includes the feed-receiving trough 426 and a vertically-extending baffle member 418 arranged for directing liquid passing the upper overflow edge 2 of the trough 426 downwardly into the primary clarifier zone 14 and in a manner whereby the thus downwardly directed liquid is distributed across the full width of that end section of the tank. At the other end of the tank, namely, in the immediate region of the end wall 415 there is a liquid-receiving and distributing means or portion provided by a receiving trough 428 and a transversely-extending baffle member 419 for causing a downwardly directed movement of liquid overflowing the edge member 2 of the trough 428. The baffle member 419 functions whereby the thus downwardly directed liquid is distributed within and across that section of the secondary clarifier zone 15 which is proximate or in the immediate region of the end wall 415.

The tank also has structures providing that which is sometimes herein referred to as a primary collecting launder, as a commingling launder and as an effluent launder. The primary collecting launder, designated 433, is disposed so that it receives solely supernatant liquid from the primary section 14. The commingling launder is made up of and includes launder sections 434ᵃ and 434ᵇ and of which the section 434ᵃ is disposed for receiving some supernatant liquid overflow there into from the primary clarifier zone 14 while section 434ᵇ is disposed for receiving some supernatant liquid overflow thereinto from the secondary clarifier zone 15. The launder sections 434ᵃ and 434ᵇ are in direct communication because of any suitable construction, as for example, through the medium of a communicating passageway provided at 434ᶜ; the effluent launder section designated 435, is disposed for receiving supernatant liquid from the secondary clarifier sections 15 and from this last mentioned launder the liquid received therein passes as effluent from the tank, or from the system employing the tank through the pipe 4.

The collecting launder 433 receives supernatant liquid from the primary compartment 14 and has a pipe 43 leading therefrom by which the supernatant liquid received therein is ultimately delivered to and upon the primary section 50 of the biologic trickling filter. Effluent from the primary section of the biologic trickling filter is passed from the sump 58 thereof by pipe 100, pump 110 and pipe 41 into the trough 426 into which incoming feed is also delivered by means of pipe 49.

The liquid received within the commingling launder section 434ᵃ passes through the conduit 434ᶜ thence into a passageway commingling launder section 434ᵇ wherein it commingles with liquid that has overflowed from the secondary clarifier zone 15 into said section 434ᵇ. The commingled liquid passes from section 434ᵇ into pipe 44 and from which the commingled liquid is ultimately delivered to and over the secondary section 51 of the biologic trickling filter. The trickling filter effluent from the secondary section 51 of the biologic filter is passed from the sump 61 thereof by the pipe 101, pump 111 and pipe 42 into the liquid-receiving and distributing means that comprises the trough 428 of the secondary clarifier compartment 15.

From that which has preceded, it will be manifest how this tank 410 is connected in cyclic arrangement with the trickling filter.

The end view, Fig. 16, of which parts are partially broken away, has been included to bring out more clearly the construction of the launders or troughs. In this connection it will be noted that a positionable or adjustable barrier 431 can be placed so as to determine the relative length as between the collecting launder 433 on the one hand and the section 434ᵃ of the commingling launder on the other hand. Likewise, a positionable or adjustable barrier 432 can be placed so as to determine the relative length as between the effluent launder section 435 on the one hand and the commingling launder section 434ᵇ on the other hand. The connecting conduit 434ᶜ for the commingled launder sections is provided so as to permit any desired degree of adjustment or regulation attainable by these members or barriers 431 and 432.

General

With respect to the clarifier tanks and in the employment of the same as shown by the several figures, it is possible to regulate the flows into and from the clarifying compartments whereby there is relatively little, if any, tendency for any substantial quantity of sedimented material to pass from the primary compartment or zone into the second compartment or zone. On the contrary, it is feasible to establish flow conditions within the tank according to which there is a tendency for sediment to pass from the secondary compartment or zone into the primary compartment or zone. Such conditions are attained by creating what are sometimes referred to as back-flow conditions. Such back-flow conditions are established by supplying a greater quantity of liquid into the secondary compartment than is permitted to escape or pass from that compartment. The accomplishing of this is furthered by lifting the overflow weir edge member for the effluent launder and of that portion of the commingling launder by which supernatant liquid is permitted to pass as overflow thereinto from the secondary compartment. This can be accomplished by adjusting the constant rate of flow of the pumps 110 at a somewhat higher rate than that of the maximum return flow by pump 111.

In connection with the foregoing, it is to be noted that the clarifier tanks hereof can be employed in a system wherein the primary and secondary filters are independent units, to wit, units which are not necessarily arranged in concentric relationship with respect to each other.

It will also be noted that Fig. 17 typifies a simple arrangement by which supernatant liquid as from a primary clarifier section is delivered to a primary biologic trickling filter section, while commingled liquid from a primary clarifier section and from a secondary clarifier section can be delivered to a secondary trickling filter section that is concentrically arranged with respect to and about the primary clarifier section.

The systems of Figs. 1 to 17 inclusive are practical and effective when proper operative attention is accorded thereto. With relative uniform inflow of material to be treated only slight operative attention is required. The advisability of such attention, however, increases as the fluctuations of inflow become more pronounced and the interludes between the crests and the dwells of flow become more irregular and of uneven duration. Having this in mind there have been included herein Figs. 18 to 23 illustrating flow-sheets or indicative systems outlining how automatic control is attained whereby the systems hereof can and will continue to function in proper balance with a minimum amount of attention under unfavorable operating conditions as, for example, when the feed or material supplied is decidedly irregular or even when the supply of feed material to be treated is entirely interrupted for a relatively long period.

*Respecting Figs. 18 and 19, 20 and 21 and 22 and 23*

In these figures like reference characters indicate like functioning parts thereof. Certain main functioning parts thereof are designated by reference characters that are the same as those which are employed to designate parts thereof that are functionally the same and which constitute corresponding parts in the several systems particularly of Figs. 1 to 7 inclusive and in some portions of the systems of Figs. 8 to 17 inclusive.

In this connection it will be noted that in the several systems or arrangements illustrated each of the several reference numerals listed below designates the part mentioned in direct association therewith, to wit, as follows:

4—Pipe leading from effluent launder 35
10—Circular clarifying tank
11—Bottom of 10
12—Marginal wall of 10
13—Vertically-extending partial partition of 10
14—Primary compartment of 10
15—Secondary compartment of 10
16—Passage area below 13 providing constant hydraulic communication between 14 and 15
17—Liquid-receiving launder extending along 12
18—Overflow edge of 17
19—Sediment-engaging and impelling mechanism for 10
20—Centrally disposed vertical axis about which 19 turns
21—Outwardly-extending arms of 19
22—Raking blades on 21—sediment-engaging and impelling elements
23—Sediment-receiving sump of 10
24—Valve-controlled discharge conduit leading from 23
25—Lower edge of 13
26—Semi-circular shell section connected to 27—provides open well constituting a primary feed-receiving and distributing means for 14
27—Plate portion of 13
28—Semi-circular shell section connected to 27—provides open well constituting a secondary liquid-receiving and distributing means for 15
30—Cross member dividing launder 17
31—Cross member dividing launder 17
32—Cross member dividing launder 17
33—Collecting launder section
34—Commingling launder section
35—Effluent launder section
41—Pipe or conduit section delivering into 26
42—Pipe or conduit section delivering into 28
43—Pipe or conduit section leading from 33
44—Pipe or conduit section leading from 34
49—Valve-controlled feed pipe or gate-controlled conduit leading to system
50—Primary trickling filter—inner filter section
51—Secondary trickling filter—outer filter section
52—Bottom of trickling filter providing 53 and 54
53—Inner floor or bottom for 50
54—Outer floor or bottom for 51
55—Centerpier
56—Cylindrical wall or intermediate member between 50 and 51
57—Outer cylindrical wall or retaining structure
58—Sump for receiving effluent from bed 59
59—Biologic bed of discrete material of 50
60—Latticed or other suitable floor for 59
61—Sump for receiving effluent from bed 62
62—Biologic bed of discrete material for 51
63—Latticed or other suitable floor for 62
70—70—Short spraying and distributing tubular arm over 59
71—71—Long spraying and distributing tubular arms over 62

72—Horizontally-turnable carrying structure for 70—70 and 71—71
73—Stationary bearing member mounted on pier 55
88—Outer liquid-receiving well from which long arms 71—71 are supplied
89—Inner liquid-receiving well from which short arms 70—70 are supplied In the arrangement of Figs. 18 and 19, 20 and 21 and 22 and 23 there appeared the following reference characters common thereto for designating like parts referred to therein:

125—Primary circuit pump pit
126—Secondary circuit pump pit
127—Primary circuit pump
128—Secondary circuit pump
129—Primary circuit transfer and overflow tank
130—Secondary circuit transfer and overflow tank
133—Primary circuit overflow pipe leading from transfer tank 129 and ultimately back to pump pit 125
134—Secondary circuit overflow pipe leading from transfer tank 130 and ultimately back to pump pit 126
135—Float-actuated back-flow control valve of primary circuit valve in pump pit 125
136—Float-actuated back-flow control valve of secondary circuit valve in pump pit 126
137—Auxiliary tank or receptacle for retaining some quantity of effluent before releasing from the system—it receives effluent from pipe 4
138—Pipe for releasing effluent from the system as overflow from 137
139—Back-flow pipe leading from bottom of 137 and terminating in branches 140 and 141
140—Branch of back-flow pipe leading into pump pit 125 for delivering effluent thereinto when valve 135 is open
141—Branch of back-flow pipe leading into pump pit 126 for delivering effluent thereinto when valve 136 is open
142—Primary pump delivery line or discharge pipe leading from pump 127 and terminating in transfer tank 129
143—Secondary pump delivery line or discharge pipe leading from pump 128 and terminating in transfer tank 130

As to the Figs. 18 and 19 the following numerals indicate the parts mentioned in association therewith:

155—Pipe leading from the bottom of transfer tank 129 and terminating in pipe section 41 that delivers into primary feed well 26
156—Pipe leading from the bottom of transfer tank 130 and terminating in pipe section 42 that delivers into secondary feed well 28
157—Primary filter gravity flow pipe leading from sump 58 and ultimately delivering into primary pump pit 125
158—Secondary filter gravity flow pipe leading from sump 61 and ultimately delivering into secondary pump pit 126

As to the Figs. 20 and 21 the following numerals indicate the parts mentioned in association therewith:

161 and 162—Pipe section 161 common to feed pipe 49 and overflow pipe 133 and pipe section 162 common to feed pipe 49, overflow pipe 133, and pipe 43, which last mentioned section 162 leads into pump pit 125

163—Transfer pipe leading from the primary transfer tank 129 and delivering liquid therefrom into the inner liquid-receiving well 89 that supplies the short distributing pipes or arms 70—70
164—Transfer pipe leading from the secondary transfer tank 130 and delivering liquid therefrom into the outer liquid-receiving well 88 that supplies the long distributing pipes or arms 71—71
165—Pipe or conduit leading from the sump 58 of the primary filter and terminating in pipe section 41 that delivers liquid into the primary feed well 26
166—Pipe or conduit leading from the sump 61 of the secondary filter and terminating in pipe section 42 that delivers liquid into the secondary feed well 28

As to the Figs. 22 and 23 the following numerals indicate parts mentioned in association therewith:

175—A feed storing tank or feed equalizing box
176—An orificed pipe leading from 175 and extending to or terminating in a pipe section 42 and provided for delivering a constant feed into the primary feed-receiving well 26
177—A float-actuated back-flow control valve in the feed equalizing box 175
178—A back-flow pipe leading from the lower interior portion of transfer tank 129 which is provided to permit a back-flow from 129 through 178 into the box 175 incident to an opening of the valve 177 following an interruption of feed supply from 49 whereby there is an abnormal drop of the liquid level within the tank 175
179—Terminal section of pipe 43 by which liquid from the collecting launder section 33 is passed directly into the primary pump pit 125
180—Terminal section of pipe 44 by which liquid from the commingling launder 34 is passed directly into the secondary pump pit 126
181—Pipe or conduit section leading from sump 58 of the primary filter and terminating in pipe section 41 that delivers liquid into the primary feed-receiving well 26
182—Pipe or conduit section leading from the sump 61 of the secondary filter and terminating in pipe section 42 that delivers liquid into the secondary liquid-receiving well 28
183—Pipe leading from primary transfer tank 129 to inner liquid-receiving well 89
184—An orificed plate or adjustable valve provided in 176 for regulating the flow passage area and thereby the quantity of feed delivered through the pipe 176 for treatment in the system
185—A valve-controlled pipe leading from feed pipe 49 of Figs. 18 and 19 for optionally delivering feed into terminal pipe section 41 leading to the primary clarifier 14 instead of having the feed delivered directly from pipe 49 into the primary pump pit 125
186—A valve-controlled pipe leading from feed pipe 49 of Figs. 20 and 21 for optionally delivering feed into terminal pipe section 41 leading to the primary clarifier 14 instead of having the feed delivered from pipe 49 through sections 161 and 162 into the primary pump pit 125

*Operation of systems of Figs. 18 and 19*

According to this system there is a constant flow of liquid into the primary clarifier section 14 and into secondary clarifier section 15. There is also a gravity flow from the primary clarifier section 14 to and for ultimate distribution over the biologic bed 59 of the primary trickling filter 50 and a gravity flow from the secondary clarifier section 15 to and for ultimate distribution over the biologic bed 62 of the secondary trickling filter 51.

In this system the feed supplied by the pipe 49 is delivered into the primary pump pit 125. During normal operation there is also delivered into this pit filter effluent which is passed thereto from the sump 58 of the primary trickling filter 50 through the pipe 157 that delivers into the primary pump pit 125. A pump 127 within the primary pump pit 125 conveys liquid therefrom through discharge pipe 142 into the primary circuit transfer tank 129 and from the bottom of which the pumped liquid is conveyed through pipe 155 that terminates in pipe section 41 into the primary feed-receiving and distributing well 26.

The effluent pipe 133 leading from the upper interior portion of transfer tank 129 is provided for transferring back into the pump pit any excess quantity of pumped liquid which may be delivered into the transfer tank 129. In this manner there is assured a relatively constant feed of liquid from the lower interior portion of the tank through the pipe 155 and pipe section 41 thereof to and for distribution into the primary clarifier section 14.

The collecting launder 33 which is associated with this primary clarifier section 14 receives supernatant liquid overflowing thereinto from the clarifier section and the liquid collected therein is conveyed therefrom by gravity through the pipe 43 which delivers the conveyed liquid into the inner feed well 89, namely, into the feed well for the primary trickling filter 50 and from which well the liquid in transit passes into the short arms 70—70 that distribute it over the biologic bed 59 of that filter. As previously indicated effluent from the bed of this trickling filter 50 is passed from the sump 58 thereof through the pipe 157 back into the pump pit 125 whereby a cyclic flow path is completed that includes the primary clarifier section 14 and the primary trickling filter 50 in arrangement for sequential and repetitive operations.

In the normal operation of the system supernatant liquid within the secondary clarifier section 15 as well as some supernatant liquid within the primary clarifier section overflows into the commingling launder 34 and the liquid is passed from this launder section 34 through the transfer pipe 44 in a manner whereby it flows under the influence of gravity into the outer liquid-receiving well 88, namely, into the feed well for the secondary trickling filter 51 and from which well the liquid in transit passes into the long arms 71—71 that distribute it over the biologic bed 62 of the secondary trickling filter 51. The effluent from the bed of this secondary trickling filter is passed from the sump 61 thereof through the pipe 158 that delivers into the secondary circuit pump pit 126. The pump 128 that is within this pump pit 126 conveys the liquid pumped thereby through the pump delivery line 143 into the secondary transfer tank 130 from which the pumped liquid is delivered through the pipe 156 having the terminal section 42 which discharges the liquid conveyed thereby into the secondary liquid-receiving and distributing well 28 of the secondary clarifier 15. In this way, it will be noted that the secondary trickling filter 51 and the secondary clarifier or clarifier section 15 are placed in a cyclic flow path whereby they are in arrangement for sequential and repetitive operations.

The overflow pipe 134 leading from the upper interior portion of the transfer tank 130 returns any excess quantity of pumped liquid back into the tank thereby assuring a relatively constant flow of liquid from the transfer tank through the pipe 156 and terminal section 42 thereof into the secondary clarifier 15.

The system hereof is devised so that when there is a discontinuance of feed material through the pipe 49 there can follow a continuation of the flow through each of the circuits just described. This continuation of cyclic flow is enabled to be realized because of an entrapped or retained quantity of treated effluent.

In the normal operation of the machine while material is being supplied to the primary circuit for treatment a like quantity of liquid is released from the secondary circuit as treated liquid. In the system under consideration the released liquid is from the supernatant liquid within the secondary clarifier 15 some of which overflows into the effluent launder 35 from which it passes through the pipe 4 into an auxiliary tank or receptacle 137 that is provided for retaining some quantity of effluent but which permits a constant overflow from an upper interior portion thereof through the pipe 138 of liquid passing from the system, to wit, as released effluent which in quantity corresponds to the quantity of liquid being fed through the pipe 49 for treatment within the system. As indicated there is retained in this auxiliary tank 137 a body of effluent having a depth extending from the bottom of the tank up to the overflow line defined by the upper end of the overflow pipe 138.

There leads from the bottom of this auxiliary tank a back-flow pipe 139 having branches 140 and 141 respectively under the control of the float-actuated back-pressure control valve 135 within the primary pump pit and the float-actuated back-pressure control valve 136 within the secondary pump pit. When the feed through the pipe 49 is interrupted this entrapped or retained liquid within the tank 137 is allowed to pass backwardly through the pipe 139 and the branches thereof into the pump pits just referred to consequent to a fall in the general surface level of the liquid in said pump pits whereby said float-actuated back-flow control valves can open to permit such flow. The volume of liquid entrapped or retained in the auxiliary tank 137 is sufficient whereby the continued cycling of liquid through both of the circuits mentioned can be indefinitely continued. In this way any septic conditions which might otherwise come into existance within the system can be avoided because of the functioning of the biologic beds of the trickling filters.

In connection with this installation, it will be observed that an important features thereof resides in the storing or retaining of a certain quantity of treated effluent, to wit, at a locality between the overflow edge 18 past which supernatant liquid must flow in passing into the effluent launder 35 and the overflow discharge to release as provided by the pipe 138. The auxiliary tank 137 might be embodied in and by the effluent launder section 35 particularly if the latter is made large enough and provided there is an outflow member as 138 located whereby there will essentially be entrapped a quantity of effluent which is available for recirculation purposes. It can be embodied in any other part of the effluent release section for the system.

*Operation of the system of Figs. 20 and 21*

This involves an arrangement in which there is a gravity flow from the primary and secondary trickling filters respectively into the corresponding primary and secondary clarifiers.

According to this arrangement the feed enters the primary pump pit 125, as all of the incoming material enters this pump pit. It will be noted that this type of feed arrangement should only be used for installations in which the feed is relatively free from suspended matter whereby there will be avoided any tendency to clog the pump or to restrict its operation.

Here the feed as above indicated is through the pipe 49 which embodies sections 161 and 162, the latter of which delivers into the primary pump pit 125. The liquid is pumped from the lower interior portion of the primary pump pit 125 and delivered upwardly through the pump discharge pipe 142 into the primary transfer tank 129. There is a gravity flow of the pumped liquid from the bottom of this tank through the pipe 163 into the inner liquid-receiving well 89, namely, the receiving well for the primary trickling filter. From this well the liquid undergoing transfer is delivered to short arms 70—70 that distribute it over the biologic bed 59 of the primary trickling filter 50. The effluent from this filter passes from the sump 58 thereof through the pipe 165 having terminal section 41 that delivers it into the primary feed-receiving and distributing well 26 from which it is distributingly delivered into the primary clarifier 14.

Supernatant liquid from this primary clarifier 14 overflows into the collecting launder 33 from which it flows by gravity through the pipe 43 and pipe section 162 into the primary pump pit 125 whereby the primary circuit or cyclic arrangement is completed.

As to this particular circuit, it will be noted that there is an overflow pipe 133 leading from the transfer tank 129 into the feed pipe 49 whereby overflow from this primary transfer tank 129 passes through pipe sections 133, 161 and 162 into the primary pump pit 125.

Supernatant liquid within the secondary clarifier 15 and supernatant liquid within the primary clarifier 14 overflows into the commingling launder 34 and passes therefrom through the pipe 44 into the secondary pump pit 126. The secondary pump 128 pumps liquid from the lower interior portion of pump pit 126 and delivers it upwardly through pump discharge pipe 143 into the secondary transfer tank 130. There is a gravity flow of pumped liquid from the lower interior portion of this tank through pipe 164 into the outer liquid-receiving well 88, namely, the receiving well for the secondary trickling filter. From this well the liquid undergoing transfer is delivered into arms 71—71 by which it is distributed over the biologic bed 62 of the secondary trickling filter 51. Effluent from this secondary filter passes from the sump 61 thereof through pipe 166 having terminal section 42 that delivers it into the secondary liquid-receiving and distributing well 128 from which it is distributingly delivered into the secondary clarifier 15.

The overflow pipe 134 leading from the upper interior portion of the transfer tank 130 returns any excess quantity of pumped liquid back into the secondary pump pit whereby there can follow relatively constant delivery of feed material to the secondary trickling filter.

In this system there is an effluent launder 35 that receives from the secondary clarifier 15 some of the supernatant, namely, supernatant that is to be released as treated liquid from the system. Here there is employed an auxiliary tank 137 for receiving effluent passed thereto through the pipe 4 from the effluent launder 35. This auxiliary tank has an overflow release pipe 138 by which there is released from the system a quantity of effluent equal to the quantity of feed. This tank 137, however, retains sufficient effluent whereby incident to an interruption of feed through the pipe 49 there can be realized a back-flow of liquid therefrom through pipe 139 and branches 140 and 141 thereof into the primary and secondary pump pits—which back-flow is realized when a drop of liquid in the pump pits causes an automatic opening of the float-actuated back-pressure control valves 135 and 136.

*Operation of system of Figs. 22 and 23*

In this system there is a gravity flow of liquid from the trickling filters to the corresponding clarifiers or clarifier sections. Here the system is equipped with an equalizing tank 175 which is relied upon for realizing a particular automatic control feature for the system. The feed is from the valve-controlled pipe or conduit 49 that delivers into the equalizing tank 175. This equalizing tank may be viewed as constituting a small storage tank located in the feed line.

The pipe 176 leading from the interior of this box downwardly and terminating in pipe section 41 delivers into the feed well 26 of the primary clarifier. This pipe 176 is provided with the orificed plate or positionable valve member 184 so as to give a constant flow of feed into the primary clarifier. The orificed plate or flow restriction valve functions to normally retain a body of feed liquid within the equalizing box up to an elevation sufficiently high for the float of the back-flow valve 177 to hold the valve in closed position. However, should this normal operative height of liquid substantially or unduly drop within the equalizing tank 175 then float-actuated back-flow control valve 177 opens to permit a back-flow of liquid from a subsequent liquid-holding portion of the system, to wit, from the transfer tank 129 and in that instance the back-flow is from the transfer tank 129 through the pipe 178 into the equalizing tank 175.

The cyclic flow paths or primary and secondary circuit arrangements of the system are as follows:

The supernatant liquid overflowing from the primary clarifier compartment into the collecting launder 33 passes therefrom under the influence of gravity through the pipe 43 having terminal section 179 that delivers into the primary pump pit 125. The pump 127 therein discharges liquid pumped thereby through the pipe 142 into the primary circuit transfer tank 129. The pumped liquid normally passes under the influence of gravity from the lower portion of this tank 129 through pipe 183 into the inner liquid-receiving well 89, viz., into the receiving well for the primary trickling filter from which it is delivered into short arms 70—70 that distribute it over and upon the biologic bed 59 of the primary filter 50. The effluent from this primary filter passes from the sump 58 thereof by gravity through pipe 181 having terminal section 41 by which the gravity flow liquid is delivered into the primary feed-receiving well 26 from which it is again distributingly delivered into the primary clarifier 14. In this way the primary circuit is completed.

There leads from the upper interior portion of the primary transfer tank 129 the pipe 133 by which excess quantities of pumped liquid are transferred back to the pump pit 125 and whereby there is assured a constant feed to the primary filter 50. Supernatant liquid from the secondary clarifier 15 and some supernatant liquid from the primary clarifier 14 overflows into the commingling launder 34 from which it passes by gravity through pipe 44 having terminal section 180 into the secondary pump pit. Pump 128 of the secondary pit 126 delivers the liquid through the pipe 143 into the secondary transfer tank 130. From the lower interior portion of the transfer tank the pumped liquid flows through pipe 184 into the outer liquid-receiving well 88, viz., into the receiving well for the secondary trickling filter from which it is delivered into long arms 71—71 that distribute it over and upon the biologic bed 62 of the secondary trickling filter 51. The effluent from this last mentioned trickling filter passes from the sump 61 thereof under the influence of gravity through the pipe 182 which terminates in pipe section 42 and which delivers the liquid passing therefrom into the secondary liquid-receiving and distributing well 28 by which the liquid is distributingly delivered into the secondary clarifier 15. In this way the secondary circuit or cyclic arrangement is completed.

The overflow pipe 134 leads from the upper interior portion of the secondary transfer tank 130 and is provided for conducting any excess quantity of pumped liquid from the transfer tank 130 back into the secondary pump pit 126.

Here as in the instance of the systems of Figs. 18 and 19 and of 20 and 21 there is provided the auxiliary tank or receptacle 137 for retaining some of the effluent passed thereto from the effluent launder 35 through pipe 4 and from which there is released from the system through the pipe 138 a quantity of effluent corresponding to the quantity of feed supplied to the system.

As in the instance of the other systems just referred to this tank 137 retains sufficient quantity of effluent for back-flow through the pipe 139 and branches 140 and 141 thereof past the valves 135 and 136 into the respective pump pits 125 and 126 whereby a continuation of the cyclic portions can continue even though abnormal operating conditions such as stoppage of feed to the system is experienced.

The systems of Figs. 18 to 22 inclusive are indicative of operative arrangement whereby the system of the type herein disclosed can be rendered substantially automatic. There is one condition, however, in which this automatic arrangement cannot be taken care of and for which manual control is advisable and that is this. A heavy wind blowing over the clarifier may unbalance the system sufficiently to cause the liquid in either pump pit to go lower than is desired. This is remedied by adjusting an overflow edge or the overflow edges of one or more particular launders. It may also be advisable to alter or deepen the notches in the clarifier weir, to wit, the notches shown in detail view shown in Fig. 10.

The foregoing indicates the manner in which a compound circulatory system of the type illustrated can be made not only effective but relatively automatic as to operation whereby there will be realized continued commercial and practical functioning of the system with a minimum requirement of watchfulness on the part of the operating force.

In a system where the feed is directly into pump pit then its use should in general be restricted to a feed which is relatively free from suspended matter. In order to make such a system more flexible it will be advantageous to provide a valve-controlled by-pass pipe such as 185 leading from feed line 49 of Figs. 18 and 19 to pipe terminal 41, or a valve-controlled pipe line as 186 leading from feed line 49 of Figs. 20 and 21 to pipe terminal 41.

Respecting each system illustrated it will be noted that—

There is a settling tank divided by a partial partition extending downwardly within the tank into a primary clarifying compartment and a secondary clarifying compartment in constant hydraulic communication with each other through passage area below the partition;

The primary compartment has a feed-distributing means such as 26 of Fig. 1 into which impure liquid containing putrescible organics may be fed;

The secondary compartment has a liquid-distributing means such as 28 of Fig. 1 into which there is passed effluent from an aerobic biologic treating means;

The primary compartment has a clarified-effluent collecting means provided by a launder such as 33 receiving supernatant liquid passing thereinto from the upper portion of the primary compartment;

The secondary compartment has a clarified-effluent collecting means provided by a launder such as 34 receiving supernatant liquid passing thereinto from the upper portion of the secondary compartment; it also receives some supernatant liquid from the primary compartment;

The apparatus has means for releasing from the apparatus a quantity of treated liquid corresponding to that of the impure liquid supplied for treatment, such treated liquid release means is typified or indicated as by the effluent launder section 35 and the outflow pipe 4 leading therefrom;

The tank is provided with means for passing sedimented material from the compartments thereof; and Biologic treating means illustrated by trickling filters is employed and thereby liquid bearing putrescible organic material and supplied thereto is subjected to active aerobic biologic treatment of a type which decreases the biologic oxygen demand of the liquid passing therefrom.

It will be noted that no matter how viewed supernatant liquid from the primary compartment is passed from the collecting means corresponding to that compartment to the biologic treating means whereby the biologic oxygen demand is decreased preparatory to the passing of the filter effluent back to the tank, viz., back to the primary compartment or to the secondary compartment or to both compartments of the tank. The result is that as to the liquid in the secondary compartment the biologic oxygen demand is substantially less than that of the biologic oxygen demand as to the liquid in the primary compartment, particularly due to the manner in which the biologic treating means is brought into operative association with the tank and the different compartments and this is true even though the two compartments are in constant hydraulic communication.

By the hook-ups described and due to the partial partition, there is minimized or lessened a tendency which would otherwise exist for the liquid in the primary compartment to contaminate the liquid in the secondary compartment.

Important features of this invention revolve about the placement and employment of this partial partition as a separation medium dividing the interior of the liquid-holding portion of a single tank into functionally different compartments.

What is claimed is:

1. A system for the clarification of polluted liquids comprising a liquid-holding tank having a bottom and marginal wall rising therefrom; means for removing sedimented material from the lower interior portion of the tank; a partial partition extending across and downwardly within the liquid-holding portion of the tank and functionally dividing it into primary and secondary clarifying compartments and having its lower edge spaced from the tank bottom to provide hydraulic communication between said compartments; a feed well for said primary compartment; a liquid-distributing well for said secondary compartment; launder means functionally remote from said wells and having overflow edge portions determining the normal surface level of the liquid within the tank and embodying a collecting launder section for receiving supernatant liquid passing thereinto from said primary clarifying compartment, a commingling launder section for receiving supernatant liquid passing thereinto from said primary and secondary clarifying compartments and an effluent launder section for receiving supernatant liquid passing thereinto from said secondary clarifying compartment; biologic treating means embodying a primary body of discrete material having biologically-active organisms and a secondary body of discrete material having biologically-active organisms; means for passing partially treated liquid from said collecting launder section of the primary clarifying compartment and for delivering the liquid passed thereby to said primary body of discrete material; means for passing effluent from the discharge side of said primary body of discrete material to said primary compartment feed well; means for passing liquid from said commingling launder section and for delivering the thus passed liquid to said secondary body of discrete material; means for passing effluent from the discharge side of said secondary body of discrete material to said secondary compartment liquid-distributing well; means for supplying incoming feed liquid to be treated to that portion of the system which includes said primary compartment feed well and said means for passing effluent from the discharge side of said primary body of discrete material to said primary compartment feed well; and means for releasing effluent liquid from said effluent launder section.

2. A system for the clarification of polluted liquids comprising a settling tank having a marginal wall and a bottom with a sediment-receiving sump; means for passing sedimented material from said sump; sediment-impelling means operable over the tank bottom for transferring sedimented solids from diverse sections of the tank bottom into said sediment-receiving sump; means for actuating said sediment-impelling means; a transverse partial partition extending downwardly within the tank and functionally dividing the liquid-holding portion of the tank into primary and secondary clarifying compartments and having its lower edge spaced from the tank bottom whereby said compartments are in hydraulic communication through passage area below said partition and through which area said sediment-impelling means pass incident to the movement thereof over the tank bottom; a feed well for said primary clarifying compartment; a liquid-distributing well for said secondary clarifying compartment; launder means functionally remote from said wells and having overflow portions determining the normal surface level of the liquid within the tank and embodying a collecting launder section for receiving liquid overflowing thereinto from said primary clarifying compartment, commingling launder sections for receiving liquid overflowing thereinto from said primary and secondary clarifying compartments and an effluent launder section for receiving liquid overflowing thereinto from said secondary clarifying compartment; biologic treating means having a primary trickling filter and a secondary trickling filter; means for passing partially treated liquid from said primary collecting launder section to said primary trickling filter; means for passing effluent from said primary trickling filter to said primary feed well; means for passing liquid from said commingling launder sections to said secondary trickling filter; means for passing effluent from said secondary trickling filter to said secondary liquid distributing well; means for supplying incoming feed liquid to be treated to that portion of the system which includes said primary feed well and the means for passing effluent from said primary trickling filter to said primary feed well; and means for releasing effluent liquid from said effluent launder section.

3. A clarification unit comprising a tank having a bottom and marginal wall rising therefrom; means for passing sediment from said tank; a vertical partition dividing the tank into a primary clarifier compartment and a secondary clarifier compartment but terminating in spaced relationship above the bottom of the tank; a feed well for the primary compartment; means for feeding impure liquid to said feed well; a liquid-distributing well for the secondary compartment; a primary launder provided along a portion of the marginal wall corresponding to the primary clarifier compartment and adapted for receiving partially treated supernatant liquid from the primary compartment; an outflow means for conducting effluent from said primary launder; a commingling launder having a section provided along a portion of the marginal wall section corresponding to the primary clarifier compartment and a section provided along a portion of the marginal wall corresponding to the secondary clarifier compartment whereby said commingling launder is adapted for receiving a quantity of partially treated supernatant liquid from the primary clarifying compartment and a quantity of supernatant liquid from said secondary compartment; and outflow means leading from said commingling launder; means for receiving liquid from said second named outflow means and for passing liquid received thereby into said liquid-distributing well; an effluent launder having a section provided along a portion of the marginal wall corresponding to the secondary clarifier compartment and adapted for receiving supernatant liquid from said secondary clarifier compartment;

and outflow means leading from said effluent launder.

4. A clarification unit according to claim 3 in which the bottom of the tank has a sediment-receiving sump; in which there is included sediment-impelling mechanism comprising raking elements for raking the bottom portion of the tank and which incident to their functioning move through the space below the vertical partition and convey raked sediment to the sediment-receiving sump; and in which the means for passing sediment from the tank leads from the sediment-receiving sump.

5. A clarification unit comprising a tank having a bottom and marginal wall rising therefrom; means for transferring sediment from said tank; a partial partition dividing the tank into horizontally disposed primary and secondary clarifier compartments and having a lower edge portion spaced from the bottom of the tank to provide hydraulic communication between said compartments; a feed well for the primary compartment; a liquid-distributing well for the secondary compartment; a primary launder section directly receiving some partially treated supernatant liquid from the primary compartment; an outflow means leading from said primary launder section; a commingling launder having a section adjacent the upper edge of the tank directly receiving some partially treated supernatant liquid from the primary clarifier compartment and a section adjacent the upper edge of the tank directly receiving some supernatant liquid from the secondary clarifier compartment; an outflow means leading from said commingling launder; an effluent launder section directly receiving some supernatant liquid from the secondary clarifier compartment, and outflow means leading from said effluent launder section.

6. A clarification unit according to claim 5, including a positionable cross member adjustable lengthwise with respect to a launder section whereby the effective length of such launder section may be varied.

7. A clarification unit comprising a tank having a bottom and marginal wall rising therefrom, raking mechanism comprising a vertical shaft and outwardly-extending raking elements for raking the bottom portion of the tank; means for actuating said raking mechanism; a vertical partition dividing the tank into a primary clarifier compartment and a secondary clarifier compartment but terminating in spaced relationship above the bottom of the tank thereby providing space for the passage of the raking elements and through which space said clarifier compartments are in constant hydraulic communication even though functionally separated by said partition member; a baffle member extending downwardly within the central portion of the tank within the primary clarifier compartment and providing between it and said partition member a primary feed-receiving and distributing means; a baffle member extending downwardly within the central portion of the tank within the secondary clarifier compartment and providing between it and said partition a secondary liquid-receiving and distributing means; a primary launder section provided along a portion only of the marginal wall section corresponding to the primary clarifier compartment and disposed for receiving supernatant liquid passing thereinto from said primary clarifier compartment; a commingling launder section provided along a portion of the marginal wall section corresponding to the primary clarifier compartment and extending along a portion of the marginal wall section corresponding to the secondary clarifier compartment and disposed for receiving supernatant liquid passing thereinto from said clarifier compartments; an effluent launder section provided along a portion of the marginal wall section corresponding to the secondary clarifier compartment and disposed for receiving supernatant liquid passing thereinto from said secondary clarifier compartment; an outflow pipe leading from said primary launder section, an outflow pipe leading from said commingling launder section; and means for releasing liquid from said effluent launder section.

8. A clarification unit as defined in and by claim 7, having a skimmer operable over both compartments and embodying a yieldable scum-conveying element movable over and past the upper edge of said partition; a scum trough disposed for receiving scum passed thereto by said scum-conveying element; and means for conducting scum from the trough.

9. A system for the clarification of polluted liquids comprising a centrally-fed liquid-holding tank having a bottom providing a sediment-receiving sump, means for passing sedimented material from said sump, a marginal wall rising from said bottom and having a marginal liquid-receiving launder with an overflow edge determining the normal surface level of the liquid within the tank, and sediment-impelling means turnable about a vertically-extending axis and embodying sediment-engaging means operable over the tank bottom for transferring sedimented solids from diverse sections of the tank bottom into said sediment-receiving sump; a vertically and transversely-extending partial partition functionally dividing the liquid-holding portion of the tank into primary and secondary clarifying compartments and having a lower edge portion spaced above said bottom thereby providing passage area through which said compartments are in constant hydraulic communication and through which area said sediment-engaging means passes incident to its movement over the tank bottom; a primary feed well at one side of but proximate the vertical central portion of said partition and functioning as a feed-receiving and liquid distributing means for said primary clarifying compartment; a secondary liquid-distributing well at the other side of but proximate the vertical central portion of said partition and functioning as a liquid-receiving and liquid-distributing means for said secondary clarifying compartment; means dividing said marginal launder into sections providing a primary collecting launder, a commingling launder and a secondary effluent launder and of which (a) the primary launder is realized by a section extending along a marginal portion of said primary clarifying compartment, (b) the commingling launder includes a section extending along a marginal portion of said primary clarifying compartment and a section extending along a marginal portion of said secondary clarifying compartment, and (c) the secondary effluent launder is realized by a section extending along a marginal portion of said secondary clarifying compartment; biologic treating means embodying a primary body of discrete material having biologically-active organisms and a secondary body of discrete material having biologically-active organisms; means for passing partially treated liquid from said primary launder and for delivering the thus passed liquid to said primary body of discrete material; means for passing effluent from the discharge side of said primary body of discrete material to said primary feed well; means for passing liquid from said commingling launder and for delivering the thus passed liquid to said secondary body of discrete material; means for passing effluent from the discharge side of said secondary body of discrete material to said secondary feed well; means for supplying incoming feed liquid to be treated whereby it is received by the primary clarifier feed wall and thereby distributed within the primary clarifying compartment; and means for releasing effluent liquid from said secondary effluent launder.

10. A system according to claim 9, in which the means for dividing the marginal launder into the three sections specified has members positionable in and with respect to the marginal launder whereby the length of any of said launder sections may be varied relative to the other launder sections thereby determining the relative quantity of liquid flowing into said launder sections.

11. A system according to claim 9, in which the partial partition within the tank extends to elevations higher than that of the overflow edge of the marginal liquid-receiving launder, in which the primary feed well and the secondary liquid-distributing well extends to elevations higher than that of said overflow edge, and in which the lower end portions of said wells terminate at elevations higher than that of the lower edge portions of the partition proximate said wells.

12. A system according to claim 1, having members functionally disposed in the launder means and positionable with respect thereto whereby the effective length of a launder section may be varied relative to the other launder sections.

13. Apparatus comprising a tank having a bottom, a partial partition dividing the tank into primary and secondary clarifying compartments in constant hydraulic communication with each other through passage area at the lower portion of the partial partition, feed-distributing means for said primary compartment, clarified-effluent collecting means at the upper portion of the primary compartment receiving supernatant liquid therefrom, liquid-distributing means for said secondary compartment, clarified-effluent collecting means at the upper portion of the tank receiving supernatant liquid from said secondary compartment, sump means for passing sedimented material from said compartments, aerobic biologic treating means essentially having biologic organisms for decreasing biologic oxygen demand of liquid supplied thereto, means for selectively passing a quantity of liquid from said primary collecting means to said biological means, means for selectively passing a quantity of clarified liquid from said secondary collecting means to said biologic means, means for transferring discharge from said biologic means to said secondary liquid-distributing means, means for supplying to the apparatus feed liquid that is passed to said primary feed-distributing means, and means for releasing from the secondary compartment a quantity of treated liquid corresponding to that of the feed liquid supplied to the apparatus.

14. Apparatus according to claim 13, having scum removal means with a unitary scum transfer member operating on both compartments and means for moving said scum removal means over the liquid in said compartments.

15. Apparatus according to claim 13, wherein the tank is round, wherein the aforementioned primary and secondary collecting means comprise launders embodied in a continuous launder structure disposed along the peripheral portion of the tank, and wherein positionable dam members are employed in the continuous launder structure for controlling the amount of effluent passing into and thereby from the launders.

16. Apparatus according to claim 13, wherein the tank is round, wherein the aforementioned clarified-effluent collecting means are provided by a continuous launder structure extending peripherally of the tank, and wherein cross members divide the interior of said launder structure into functionally separate launders.

17. Apparatus according to claim 13, also comprising trickling filter means composed of two independent concentrically disposed filter compartments of which one is a primary and one is a secondary, means for passing effluent from the primary clarifying compartment to the primary filter compartment, means for passing primary filter discharge as feed to the primary clarifying compartment, means for passing effluent from the secondary clarifying compartment to the secondary filter compartment, and means for passing secondary filter discharge as feed to the secondary clarifying compartment.

18. A system operating according to a continuous process for the clarification of polluted liquids comprising a primary clarifier; a secondary clarifier horizontally disposed with respect to the primary clarifier; means providing passage area extending between the lower interior portions of said clarifiers whereby they are in constant hydraulic communication and whereby the surface levels of any bodies of liquid in said clarifiers are at substantially the same elevation; a primary feed-receiving and distributing means for said primary clarifier; a secondary liquid-receiving and distributing means for said secondary clarifier; a collecting launder associated with said primary clarifier for receiving supernatant liquid overflowing thereinto from said primary clarifier; a commingling launder comprising sections associated with the primary and secondary clarifiers for receiving supernatant liquid overflowing thereinto from said primary and secondary clarifiers; a primary trickling filter having a biologic bed; a secondary trickling filter having a biologic bed; a primary transfer means for passing liquid from said primary collecting launder for delivery to and for distribution over the biologic bed of said primary trickling filter and another primary transfer means for passing effluent from said primary trickling filter into said primary feed-receiving and distributing means whereby said two primary transfer means, said primary clarifier and said primary trickling filter are in cyclic arrangement and collectively complete a primary circuit; a secondary transfer means for passing liquid from said commingling launder to and for distribution over the biologic bed of said secondary trickling filter and another secondary transfer means for passing effluent from said secondary trickling filter into said secondary liquid-receiving and distributing means whereby said two secondary transfer means, said secondary clarifier and said secondary trickling filter are in cyclic arrangement and collectively complete a secondary circuit; which said secondary circuit continuously receives some of the liquid from the primary circuit because of the commingling launder which receives some supernatant liquid flowing thereinto from the primary clarifier; means leading into the primary circuit for supplying thereinto incoming feed liquid to be treated; and means leading from the secondary circuit for releasing therefrom as treated effluent a quantity of liquid corresponding to that of the feed liquid supplied to the primary circuit; one of said primary transfer means comprising as functioning parts thereof a primary pump pit for receiving liquid passing through the primary transfer means, a primary transfer tank, a primary pump for forwardly passing liquid from said primary pump pit into said primary transfer tank, a forward flow pipe leading from the lower interior portion of the transfer tank, and a back-flow pipe leading from an upper interior portion of the transfer tank back into the primary pump pit; one of said secondary transfer means comprising as functioning parts thereof a secondary pump pit for receiving liquid passing through said secondary transfer means, a secondary transfer tank, a secondary pump for forwardly passing liquid from said secondary pump pit into said secondary transfer tank, a forward flow pipe leading from the lower interior portion of the secondary transfer tank, and a back-flow pipe leading from the upper interior portion of said secondary transfer tank back into the secondary pump pit; said means for releasing treated effluent from the secondary circuit comprising as functioning parts thereof an auxiliary tank for retaining some of the effluent and an overflow pipe leading from the upper interior portion of said auxiliary tank and also comprising a branched back-flow pipe leading from the auxiliary tank and of which one of said branches leads into the primary pump pit while another of said branches leads into the secondary pump pit; and a float-actuated back-flow valve in and for each of said pump pits and cooperatively associated with the back-flow branch leading to the pump pit to which the float valve corresponds.

19. A system according to claim 18, in which the means for supplying the incoming liquid to be treated comprises an equalizing tank into which the incoming liquid is initially received; a pipe leading from said equalizing tank and delivering into the primary circuit; and means in said pipe for providing a restricted and regulated flow of liquid therethrough; in which there is a back-flow pipe leading from a higher forwardly disposed liquid-holding portion of the system back into the equalizing tank, and in which there is a float-actuated back-flow control valve in said equalizing tank, which valve is associated with said back-flow pipe for permitting back-flow into the equalizing tank when the liquid therein drops sufficiently to permit the float to open the valve actuated thereby.

20. A system for the clarification of polluted liquids comprising a clarifier having a feed-receiving and distributing means and also having spaced from the latter a supernatant liquid-receiving launder; a trickling filter having a biologic bed; means for transferring liquid from said launder to and for distribution over the biologic bed of the trickling filter; means for transferring and delivering trickling filter effluent to and into said feed-receiving and distributing means of the clarifier; which said clarifier, said trickling filter and said two transfer means are in cyclic arrangement and provide a treating circuit; inflow means for feeding liquid to said treating circuit an outflow means leading from said treating circuit for passing therefrom liquid treated therein; one of said transfer means having a pump pit for receiving liquid in transit within the treating circuit and pumping means for lifting and forwarding the liquid in transit; said outflow means having an auxiliary tank with an overflow means leading from the upper interior portion of said auxiliary tank and a back-flow pipe leading from a lower interior portion of said auxiliary tank into said pump pit; and an automatically opened back-flow control valve functionally associated with said back-flow pipe and liquid within the pump pit and which when open permits a gravity influenced back-flow of liquid through said back-flow pipe from the auxiliary tank into the pump pit and which back-flow control valve opens incident to a substantial lowering of the liquid within the pump pit.

21. A system for the clarification of polluted liquids comprising a clarifier having a feed-receiving and distributing means and also having spaced from said means a supernatant liquid-receiving launder; a trickling filter having a biologic bed; means for transferring liquid from said launder to and for distribution over the biologic bed of the trickling filter; means for transferring and delivering trickling filter effluent to and into said feed-receiving and distributing means whereby said biologic bed, said clarifier and said two transfer means are in cyclic arrangement and thus provide a cyclic treating circuit; a transfer and overflow tank in said circuit; inflow means for feeding liquid into said treating circuit; and an outflow means for passing treated liquid from said circuit; a pump pit in one of said transfer means for receiving the liquid in transit and pumping means for passing liquid within said pump pit forwardly in transit therefrom; a feed equalizing tank in said inflow means; a pipe leading from said equalizing tank for delivering the liquid passing therethrough into said treating circuit; a flow-restricting member provided in and for said pipe for regulating the quantity of liquid passing therefrom; a back-flow pipe operatively associated with said inflow means and leading from said transfer and overflow tank into the equalizing tank; and a float-actuated back-pressure control valve in said equalizing tank for opening and permitting a gravity flow of liquid through said back-flow pipe into said equalizing tank incident to a substantial lowering of the level of the liquid within said equalizing tank.

HENNING ASTRUP TREBLER.